(12) United States Patent
Shope et al.

(10) Patent No.: US 10,284,353 B2
(45) Date of Patent: May 7, 2019

(54) SUBSURFACE RADIO

(71) Applicant: Sandia Research Corporation, Mesa, AZ (US)

(72) Inventors: Steven Michael Shope, Mesa, AZ (US); Paul Raymond Jorgenson, Phoenix, AZ (US)

(73) Assignee: Sandia Research Corporation, Mesa, AZ (US)

( * ) Notice: Subject to any disclaimer, the term of this patent is extended or adjusted under 35 U.S.C. 154(b) by 181 days.

(21) Appl. No.: 15/338,207

(22) Filed: Oct. 28, 2016

(65) Prior Publication Data

US 2018/0123232 A1     May 3, 2018

(51) Int. Cl.
    *H01Q 1/04*          (2006.01)
    *H04L 5/00*          (2006.01)
    *H01Q 1/30*          (2006.01)

(52) U.S. Cl.
    CPC .............. *H04L 5/006* (2013.01); *H01Q 1/04* (2013.01); *H01Q 1/30* (2013.01)

(58) Field of Classification Search
    CPC ............. H04L 5/006; H01Q 1/04; H01Q 1/30
    See application file for complete search history.

(56) References Cited

U.S. PATENT DOCUMENTS

| | | | |
|---|---|---|---|
| 4,652,857 A | 3/1987 | Meiksin | |
| 4,777,652 A | 10/1988 | Stolarczyk | |
| 4,879,755 A | 11/1989 | Stolarczyk et al. | |
| 5,432,838 A | 7/1995 | Purchase et al. | |
| 8,115,622 B2 | 2/2012 | Stolarczyk et al. | |
| 8,428,511 B1 | 4/2013 | Gunasekara et al. | |
| 8,462,829 B2 | 6/2013 | Shope et al. | |
| 9,331,374 B2 | 5/2016 | Coldrey et al. | |
| 9,356,706 B2 * | 5/2016 | Stolarczyk | ......... H04B 7/15514 |
| 2009/0248920 A1 * | 10/2009 | Chaudhuri | ............ G06F 9/3879 |
| | | | 710/52 |

OTHER PUBLICATIONS

The ARRL Antenna Book, by Gerald Hall, 1988.*

(Continued)

*Primary Examiner* — Jessica Han
*Assistant Examiner* — Awat M Salih
(74) *Attorney, Agent, or Firm* — Atesa Legal PLLC

(57) ABSTRACT

A method for subsurface radio communication includes transmitting voice data through a subsurface environment, by a transmitter of a radio transceiver. The voice data is received through the subsurface environment, by a receiver of the radio transceiver. A transceiver frequency of the radio transceiver is changed to an optimal transceiver frequency in response to a change to the subsurface environment. The transceiver frequency is one of a transmit frequency of the transmitter and a receive frequency of the receiver. A first impedance of a subwavelength antenna is matched to a second impedance of the transceiver in response to a difference between the first impedance and the second impedance exceeding an impedance mismatch value. The subwavelength antenna has a radiating length less than a transceiver wavelength of the radio transceiver operating in free-space at a maximum of the transceiver frequency.

20 Claims, 30 Drawing Sheets

(56) References Cited

OTHER PUBLICATIONS

H. K. Sacks, "Medium-Frequency Propagation in Coal Mines," Proceedings of the Fourth WVU Conference on Coal Mine Electrotechnology, Aug. 1978; pp. 27-1-27-12; 12 pages.

Jeff Lytle, "The Lisbourne Experiments: Propagation of HF Radio Waves Through Permafrost Rock," LLNL Report LCRL-51474, Oct. 1973; 78 pages.

Patrick A. Murphy, "Medium Frequency Radio System Modifications for Refuge Chamber Situational Awareness," Kutta Radios Inc. Contract 200-2012-53504 Final Report, Sep. 2013; 37 pages.

Paul R. Jorgenson, "80 Meter HF Radio Experiments," SPELEONICS 25, vol. VII #1, Jun. 2005, pp. 25-26; 2 pages.

Paul R. Jorgenson, "An HF Portable Antenna," SPELEONICS 26, vol. VII #2, Jun. 2007, pp. 17-18; 2 pages.

Paul R. Jorgenson, "Carlsbad Caverns Radio Caving," SPELEONICS 27, vol. VII #3, Jun. 2011, pp. 10-14; 5 pages.

Paul R. Jorgenson, "HF Radio at Grand Canyon Caverns," SPELEONICS 26, vol. VII #2, Jun. 2007, pp. 24-25; 2 pages.

Paul R. Jorgenson, "Homebuilt HF Radios for Use Underground," SPELEONICS 26, vol. VII #2, Jun. 2007, pp. 19-23; 5 pages.

Robert L. Lagace, "Modelling and Data Analysis of 50 to 5000 KHz Radio Wave Propagation in Coal Mines," Bureau of Mines Contract HO346045 Final Report, Feb. 1980; 122 pages.

Robert L. Lagace, "Propagation of Radio Waves in Coal Mines," Bureau of Mines Contract HO346045-TO-1, Oct. 1975; 174 pages.

Terry S. Cory, "Antenna Design & Coupling Studies at Medium Frequency for Improved Coal Mine Communications," Bureau of Mines Purchase Order P3332223 Final Report, Dec. 1978; 56 pages.

Terry S. Cory, "Electromagnetic Propagation in Low Coal Mines at Medium Frequencies," Bureau of Mines Contract HO377053 Final Report, Jun. 1978; 95 pages.

Terry S. Cory, "Propagation of EM Signal in Underground Mines," Bureau of Mines Contract H0366028 Final Report, Sep. 1977; 142 pages.

Terry S. Cory, "Propagation of EM Signals in Underground Metal/Nonmetal Mines," Bureau of Mines Contract U0308012 Final Report, Aug. 1981; 264 pages.

William C. Laubengayer, "Coal Mine Communication System: vol. 3," Bureau of Mines Contract HO232056 Final Report, Nov. 1974; 102 pages.

\* cited by examiner

SUBSURFACE RADIO

GOVERNMENT RIGHTS IN THE INVENTION

This invention was made with government support under SBIR Award Numbers 2011-ST-065-ARP003 and D13PC00050, awarded by the Department of Homeland Security. The government has certain rights in the invention subject to Federal Acquisition Regulation (FAR) clause 52.227-20 and Defense Federal Acquisition Regulation (DFARS) 252.227-7018.

FIELD OF THE INVENTION

This disclosure relates generally to communications. More specifically, the invention relates to radio communications through a high absorption transmission medium in a subsurface environment.

BACKGROUND

On and above the surface of the earth, radio transmission is fairly well understood. In subsurface environments, the problem is highly complex because of the electrical properties of the subsurface media along with complex geological layering and structural features. The underground mining industry, in particular the US Bureau of Mines and its successor, the National Institute of Occupational Safety and Health (NIOSH) have conducted decades of research into underground communications. Although, improved mine operational efficiencies can results from better communications, the impetus for this research has been for post-disaster emergency communications in order for the rapid assessment of mine conditions and the location of trapped or barricaded miners. In general, this research focused on non-propagating magnetic induction communications, medium frequency communications, and UHF communications. Although the quasi-static, magnetic induction, communications works very well at short ranges (less than 1,000 feet) it is cumbersome to deploy and is unsatisfactory for longer range communication links where a highly mobile solution is sought.

The use of Low Frequency (LF) communications is common in mines with electrified railroads where FM carrier communications over the electric train trolley-wire with the rail serving as the return signal path is used. This is a highly dependable communication system and is mechanically more robust than typically wired telephone systems. The nominal carrier frequency is from 61 to 190 kHz. The disadvantage is that communications are limited to devices connected to the trolley-wire and track, which is useless for users not in proximity to a rail line.

The use of Medium Frequency (MF) communications in mines have been the subject of a large amount of research and development efforts. MF communications in mines can take advantage of existing mine infrastructure, such as rails, pipes, communication cables, etc. where the MF signals parasitically couple to these infrastructure systems. This allows extended propagation of the MF signals in a mine. Additionally, the geological nature of many coal seams have a conductive rock layer bounding the low-conductivity coal both above and below a seam. This can create a dielectric waveguide in which MF signals can readily propagate.

Very little research has been done on the use of High Frequencies (HF) for communications in mines. Common attenuation rates exceeding 70 dB/100 ft have made the use of HF frequencies unattractive for coal mine communications.

Leaky feeder mine communication systems using UHF frequencies are available commercially. A leaky feeder communication system consists of a coaxial cable, run along mine passageways, which emits and receives radio waves, functioning as an extended antenna. The cable is "leaky" in that it has gaps or slots in its outer conductor to allow the radio signal to leak into or out of the cable along its entire length. Because of this leakage of signal, line amplifiers must be inserted at regular intervals, typically every 1,000 to 5,000 feet, to amplify the signal. The signal is detected by personnel-carried portable transceivers. Transmissions from the portable transceivers are picked up by the feeder and carried to other parts of the mine, allowing two-way radio communication throughout the mine. These systems use the lower part of the UHF band (300 MHz-3 GHz) with typical operation at 350 MHz to 450 MHz. The system has a limited range and because the signal frequencies used by leaky feeder systems cannot pass through solid coal or rock; thus limiting the range of communications to line-of-sight of the leaky feeder cable.

BRIEF SUMMARY

As will be appreciated, embodiments as disclosed include at least the following. In one embodiment, a subsurface radio comprises a radio transceiver including a transmitter configured to transmit a voice data through a subsurface environment, and a receiver configured to receive the voice data through the subsurface environment. A subwavelength antenna is coupled to the radio transceiver and is configured to radiate an electromagnetic (EM) wave modulating the voice data. The subwavelength antenna has a radiating length less than a transceiver wavelength of the radio transceiver operating in free-space at a maximum of a transceiver frequency, wherein the transceiver frequency is one of a transmit frequency of the transmitter and a receive frequency of the receiver. A control unit is configured to change the transceiver frequency to an optimal transceiver frequency in response to a change to the subsurface environment. An impedance matching circuit is configured to match a first impedance of the subwavelength antenna to a second impedance of the transceiver in response to a difference between the first impedance and the second impedance exceeding an impedance mismatch value.

Alternative embodiments of the subsurface radio include one of the following features, or any combination thereof. The transceiver frequency is greater than or equal to 2 Mhz, and less than or equal to 150 Mhz. The radiating length of the subwavelength antenna is greater than one tenth of one percent of a freespace wavelength of the radio transceiver. A power output of the radio transceiver is equal to or less than 100 Watts. A portable pack includes the radio transceiver, and the portable pack is configured for removable attachment to a person and having a trailing antenna extending therefrom. The radio transceiver is configured as a base station. The subsurface environment is a subterranean environment. The subsurface environment is an aqueous environment. The subsurface environment is an interior of a building. The control unit detects a change to the subsurface environment by periodically measuring a signal to noise ratio (SNR) from a transmission between a second radio transceiver and the radio transceiver, the control unit modifying the transceiver frequency of the radio transceiver to maximize the SNR.

In another embodiment, a method for subsurface radio communication comprises transmitting a voice data through a subsurface environment, by a transmitter of a radio transceiver. The voice data is received through the subsurface environment, by a receiver of the radio transceiver. A transceiver frequency of the radio transceiver is changed to an optimal transceiver frequency in response to a change to the subsurface environment, wherein the transceiver frequency is one of a transmit frequency of the transmitter and a receive frequency of the receiver. A first impedance of a subwavelength antenna is matched to a second impedance of the transceiver in response to a difference between the first impedance and the second impedance exceeding an impedance mismatch value. The subwavelength antenna has a radiating length less than a transceiver wavelength of the radio transceiver operating in free-space at a maximum of the transceiver frequency.

Alternative embodiments of the method for subsurface radio communication include one of the following features, or any combination thereof. An underground optimal link establishment (UGOLE) operation is initialized by transmitting a UGOLE request from the radio transceiver to a slave radio transceiver tuned to a same transceiver frequency as the radio transceiver, and receiving from the slave radio transceiver a UGOLE reply, in response to the slave radio receiving the initiating code; transmitting by the radio transceiver and receiving by the slave radio transceiver, for each of a plurality of transceiver frequencies, a continuous wave (CW) tone; recording by the slave radio transceiver, for each of the plurality of transceiver frequencies, at least one of a respective signal to noise ratio (SNR) and a respective signal strength of the CW tone received by the slave radio transceiver; transmitting by the slave radio transceiver and receiving by the radio transceiver, for each of a plurality of transceiver frequencies, the respective SNR and the respective signal strength; transmitting by the slave radio transceiver and receiving by the radio transceiver, the CW tone for each of a plurality of transceiver frequencies; recording by the radio transceiver, for each of the plurality of transceiver frequencies, at least one of the respective signal to noise ratio (SNR) and the respective signal strength of the CW tone received by the radio transceiver; and determining the optimal transceiver frequency based on at least one of a respective maximum SNR and a respective maximum signal strength recorded from each of the transmissions from the radio transceiver to the slave radio transceiver and the transmissions from the slave radio transceiver to the radio transceiver. The optimal transceiver frequency is determined as an average of a first maximum SNR from the transmissions from the radio transceiver to the slave radio transceiver and a second maximum SNR from the transmissions from the slave radio transceiver to the radio transceiver. The radio transceiver records the respective SNR and the respective signal strength of the CW tone transmitted by the slave radio transceiver for one of the plurality of transceiver frequencies before changing to a new one of the plurality of transceiver frequencies. An automatic channel control (ACC) operation is initiated by transmitting, by the radio transceiver, an ACC request to a slave radio transceiver on an old transceiver frequency; changing the old transceiver frequency of the radio transceiver to a new transceiver frequency; changing the old transceiver frequency of the slave radio to the new transceiver frequency in response to the slave radio receiving the ACC request; receiving by the radio transceiver a handshake reply from the slave transceiver radio on the new transceiver frequency, in response to the slave transceiver radio receiving a handshake request from the radio transceiver on the new transceiver frequency; changing the new transceiver frequency of the radio transceiver to the old transceiver frequency in response to the radio transceiver not receiving the handshake reply after a predetermined time; and changing the new transceiver frequency of the slave radio transceiver to the old transceiver frequency in response to the slave radio transceiver not receiving the handshake request after the predetermined time. The difference between the first impedance and the second impedance is determined in response to the radio transceiver beginning transmission of the voice data, the transmission being interrupted when the difference exceeds the impedance mismatch value. The difference between the first impedance and the second impedance is determined from a voltage level and a phase of a reflected pulse from a slave radio transceiver, the reflected pulse reflected from the slave radio transceiver in response to a periodic pulse transmitted from the radio transceiver. A circuit configured to determine the difference between the first impedance and the second impedance is disabled in response to the radio transceiver beginning transmission of the voice data. Determining the difference between the first impedance and the second impedance is based on a prediction of previously stored differences between the first impedance and the second impedance.

In another embodiment, a method for subsurface radio communication comprises transmitting a data through a subsurface environment, by a transmitter of a radio transceiver; receiving the data through the subsurface environment, by a receiver of the radio transceiver; changing a transceiver frequency of the radio transceiver to an optimal transceiver frequency in response to a change to the subsurface environment, wherein the transceiver frequency is one of a transmit frequency of the transmitter and a receive frequency of the receiver, the optimal transceiver frequency determined from a maximum signal to noise ratio (SNR) measured from a transmission between the radio transceiver and a slave radio transceiver; and matching a first impedance of a subwavelength antenna to a second impedance of the transceiver in response to a difference between the first impedance and the second impedance exceeding an impedance mismatch value, the subwavelength antenna having a radiating length less than a wavelength of a transceiver wavelength of the radio transceiver operating in free-space at a maximum of the transceiver frequency.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Figure 1:
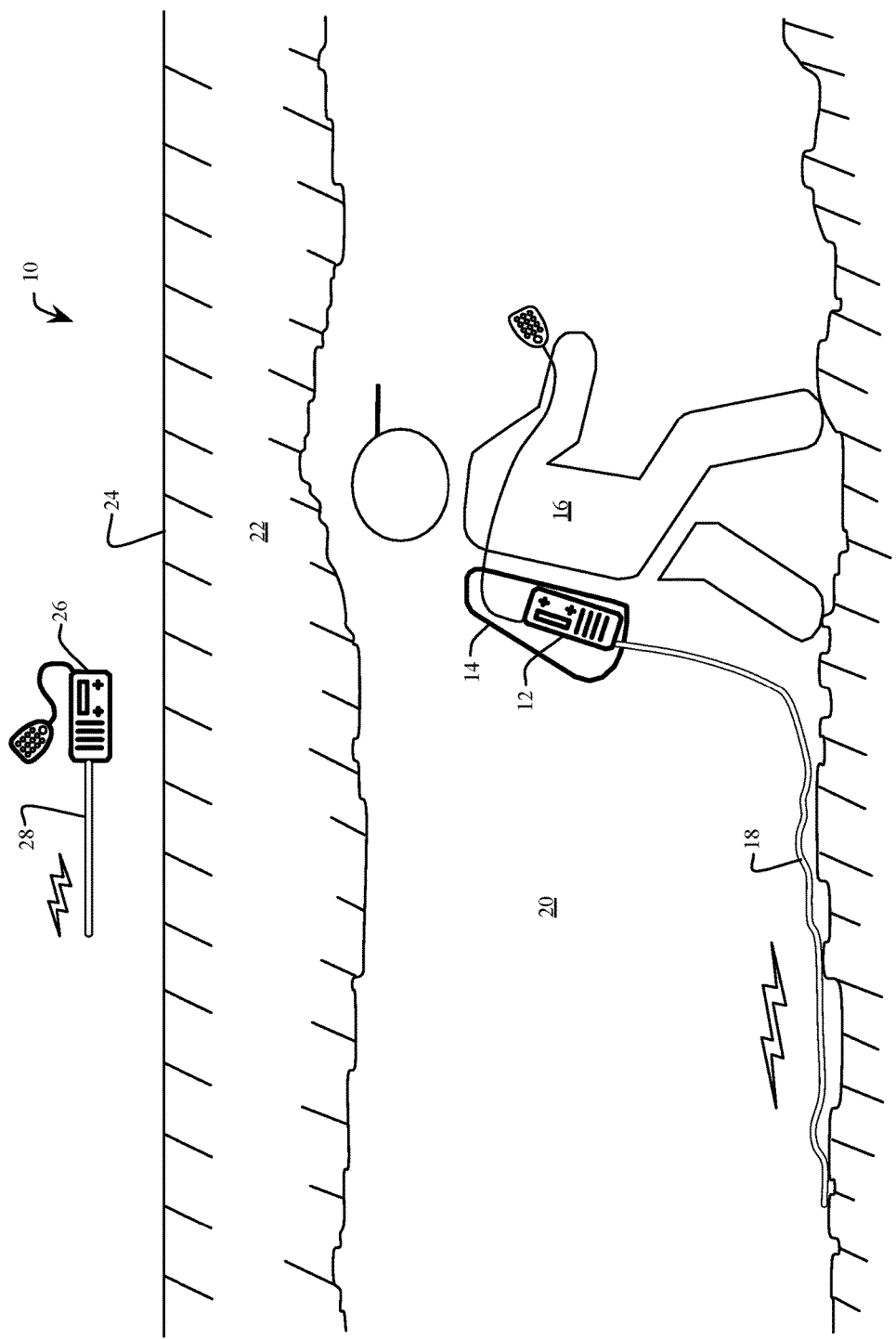
FIG. 1 is a cross sectional view of a subsurface radio system operated in a subterranean through-the-earth environment in accordance with an embodiment of the present disclosure.

Previously, wireless radio communications between underground and underwater locations to the surface and above the surface has not been possible. Research in coal mines support this opinion where radio frequency (RF) signals above 1 MHz experience high rates of attenuation. This is likely because of the lossy geological materials associated with coal seams such as the shale that often overlay and lie beneath coal seams. The inventors have discovered and shown experimentally, that in most geologies, the use of frequencies between 2 MHz and 150 MHz is effective voice and data communications with proper selection of transmit and receive frequencies and adaptive antenna tuning due to the highly sensitive nature of impedance mismatch while operating in this environment. Communications at depths of 750 feet have been achieved. Communications from an 85-ft deep cave to a surface position located approximately 5.0 miles offset have been achieved. These experiments were conducted with modest power levels of 25 Watts and below.

Disclosed is a functional subsurface through-the-earth (TTE) radio communications system. Subsurface locations include subterranean locations, which refer to any location located beneath the surface including but not limited to caves, mines, tunnels, basements, underground facilities, sewers, drainage systems, karez, crawlways, subway systems, earth fissures, sinkholes, utility networks, and storage systems. Additionally, the radio communications system disclosed herein will work underwater. Surface refers to the earth's surface, whether it is rock, soil, water, ice, snow or other naturally or man-made materials including building structures, which forms a boundary with the atmosphere. Minimum communications in the application require two separate transceivers. All communications references in this application refer to a minimum two transceivers and an unlimited maximum number of transceivers. Surface locations also include locations that are vertically offset from the underground transceiver as well as being horizontally offset from the vertical axis of the underground transceiver. Communications in this application can be modulated using a variety of conventional modulation methods such as digital baseband, amplitude modulation (AM), frequency modulation (FM), single-side-band (SSB), and all other commonly used modulation techniques. Communications in this application can be analog or digital. In some embodiments, digital signal processing, for example as described in U.S. Pat. No. 8,462,829, can be used to improve system performance.

Contrary to long-held beliefs in this field, the inventors have discovered that antennas that are much shorter than a free-space wavelength can be highly effective with the embodiments described herein, and thus allow mobile operations in many locations previously inaccessible with traditional mobile transceivers. In various non-limiting embodiments, trailing wire antennas that are between 3% and 10% of a free-space wavelength can be highly effective yet physically short, thus enabling the mobility of the transceiver with attached antenna operating in an effective frequency range (e.g. between 2 Mhz and 150 Mhz in various embodiments). In other embodiments, trailing wire antennas spanning the range of 0.1% to 25% have been used effectively, with longer antennas providing more gain at the expense of mobility.

With reference to FIG. 1, an embodiment 10 of a subsurface radio system is shown. In this embodiment, a subsurface radio transceiver 12 is transported in a backpack 14 carried by a human 16. A short trailing antenna 18 is connected to the transceiver 12 through an opening in the backpack 14. The transceiver is easily transported through a tunnel 20 (or cave) formed in rock 22 (e.g. limestone or granite) for example, beneath a subsurface 24. In the illustrated embodiment, a second transceiver 26 with a corresponding antenna 28 is located above the subsurface 24 and able to effectively communicate with the transceiver 12, providing critical communication in a typically harsh environment.

Figure 2:
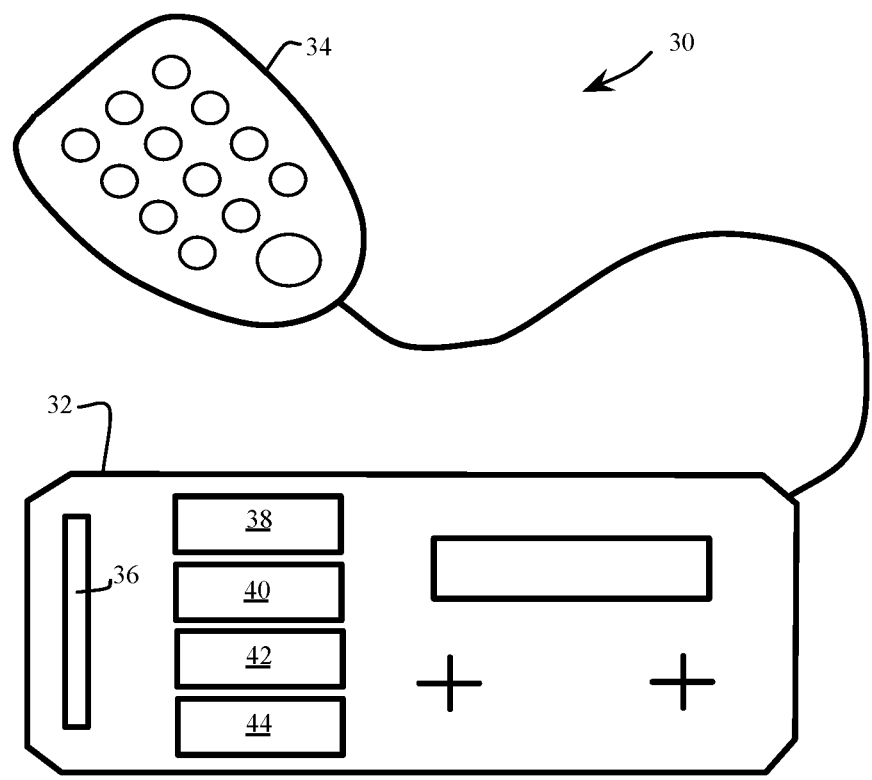
FIG. 2 is a schematic view of a subsurface radio in accordance with an embodiment of the present disclosure.

FIG. 2 shows an embodiment 30 of a subsurface radio in more detail. The embodiment 30 includes a transceiver with a hand held microphone 34 for audio and control inputs. The transceiver 32 further includes an internal antenna 36 in some embodiments. In other embodiments, an external antenna is used, with an electrical attachment to the transceiver 32. The embodiment 30 includes an Underground Optimal Link Establishment (UGOLE) module 38, an Automatic Channel Control (ACC) module 40, an impedance matching module 42, and a control unit 44 provides various control functions together with the UGOLE module 38, the ACC module 40 and the impedance matching module 42. In various embodiments, the term "module" is a circuit, thus the impedance matching module 44 is an impedance matching circuit. In other embodiments, the term "module" includes one or more of a software, firmware or hardware implementation.

Figure 3:
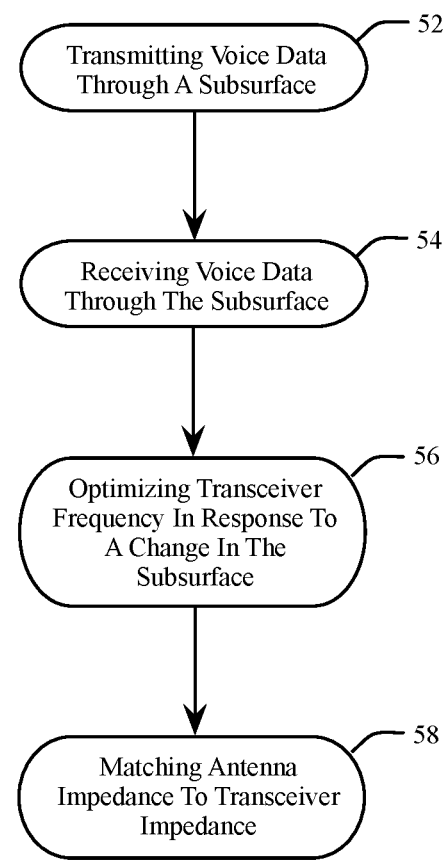
FIG. 3 is a flowchart representation of a method for subsurface radio communication in accordance with an embodiment of the present disclosure.

FIG. 3 is flowchart of a method for subsurface radio communication according to a non-limiting embodiment of the present disclosure. Referring to FIG. 1, FIG. 2 and FIG. 3, at 52 transceiver 12 transmits voice data through a subsurface 24, (e.g., to be received by transceiver 26). At 54, the transceiver 12 receives voice data through the subsurface 24 (e.g., transmitted by transceiver 26). In other embodiments, the voice data is replaced with a combination of one or more of voice data, text data, or continuous wave (CW) tones. At 56, the transceiver 12 optimizes the transceiver frequency in response to a change in the subsurface. For example, a change to the subsurface between the transceiver 12 and the transceiver 26 occurs as the human 16 moves through the tunnel. A change to the subsurface also occurs when other objects move in or near the environment through which the transceivers 12 and 26 communicate (e.g. a vehicle moving on the subsurface 24).

In various embodiments the transceiver frequency is either the transmit frequency or the receive frequency of the transceiver 12, in a duplex system. In a simplex system, the transmit frequency and the receive frequency are the same. The embodiments of the transceivers described herein are envisioned to include simplex and duplex transceivers, the later having either a positive or negative offset between the transmit frequency and the receive frequency. With reference to FIG. 2 and FIG. 3, at 56, the transceiver frequency is optimized by performing a UGOLE operation. In one embodiment, the UGOLE operation is performed with the UGOLE module 38. In another embodiment, the UGOLE operation is performed by the control unit 44 in communication with the UGOLE module 38. At 58, the impedance matching module 42, either directly or under the control of the control unit 44, matches an impedance of the antenna 18, to an impedance of the transceiver 12.

With reference to FIG. 2, in various embodiments, the control unit 44 controls the operation of one or more of the UGOLE module 38, the ACC module 40 and the impedance matching module 42, as well as the general operation of the transceiver 32 (e.g. controlling the display, decoding control inputs, managing power and various other operations). In other embodiments, one or more of the UGOLE module 38, the ACC module 40, and the impedance matching module 42 operate independently.

In various embodiments, the impedance matching module 42 further includes functions to perform impedance matching at the beginning of a transmission by the transceiver 32, whereby the transmission is interrupted during the matching process. In another embodiment, the impedance matching module 42 includes functions to periodically perform impedance matching. In another embodiment, the impedance matching module 42 includes a history of previously stored impedance differences between the antenna and the transceiver to shorten the time required to perform impedance matching. In another embodiment, the previously stored impedance differences are used to predict new impedance matching values based on extrapolating data values for example. In another embodiment, the impedance matching module 42 disables periodic checking of the impedance mismatch between the antenna and the transceiver and relies on impedance mismatch detection at the onset of transmission. For example, when an interval between transmissions is short, the requirement for periodic impedance matching is reduced or eliminated.

In some embodiments, when the UGOLE operation is performed, the control unit 44 will initiate the ACC operation and the impedance matching operation depending upon the change in transceiver frequency caused by the UGOLE operation.

Figure 4:
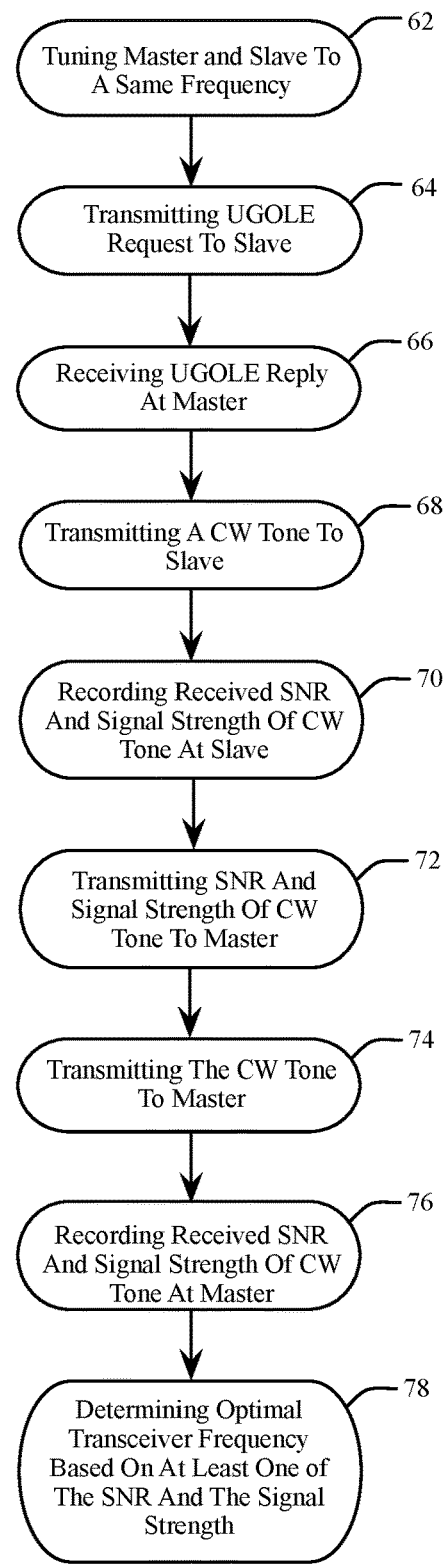
FIG. 4 is a flowchart representation of a method for Underground Optimal Link Establishment (UGOLE) in accordance with an embodiment of the present disclosure.

Referring to FIG. 4, with ongoing reference to FIG. 1 and FIG. 2, the UGOLE operation is described. At 62, both the master transceiver 12 and the slave transceiver 26 are tuned to the same frequency. In this example, the transceiver 12 is the master, however in other embodiments, either the transceiver 12 or the transceiver 26 is the master, (e.g., based on first to transmit or preprogrammed priority). At 64, the master transceiver 12 transmits a UGOLE request (e.g., a special code) to the slave transceiver 26. At 66, the slave receives the UGOLE request and sends a UGOLE reply, which is received at the master transceiver 12, thus completing a handshake between the master transceiver 12 and the slave transceiver 26, to indicate that the slave transceiver 26 is ready for the UGOLE operation.

At 68, a CW tone is transmitted from the master transceiver 12 to the slave transceiver 26 for a predetermined time. At 70, a Signal to Noise Ratio (SNR) and a signal strength of the received CW tone is recorded at the slave transceiver 26. In one embodiment, the signal strength is an RMS value, while in another embodiment, the signal strength is a peak signal. At 72, the slave transceiver 26 transmits the recorded SNR and signal strength to the master transceiver 12. Conversely, at 74, the slave transceiver 26 transmits the CW tone to the master transceiver 12 for a predetermined time, and then the master transceiver 12 records the SNR and signal strength of the received tone.

Figure 5:
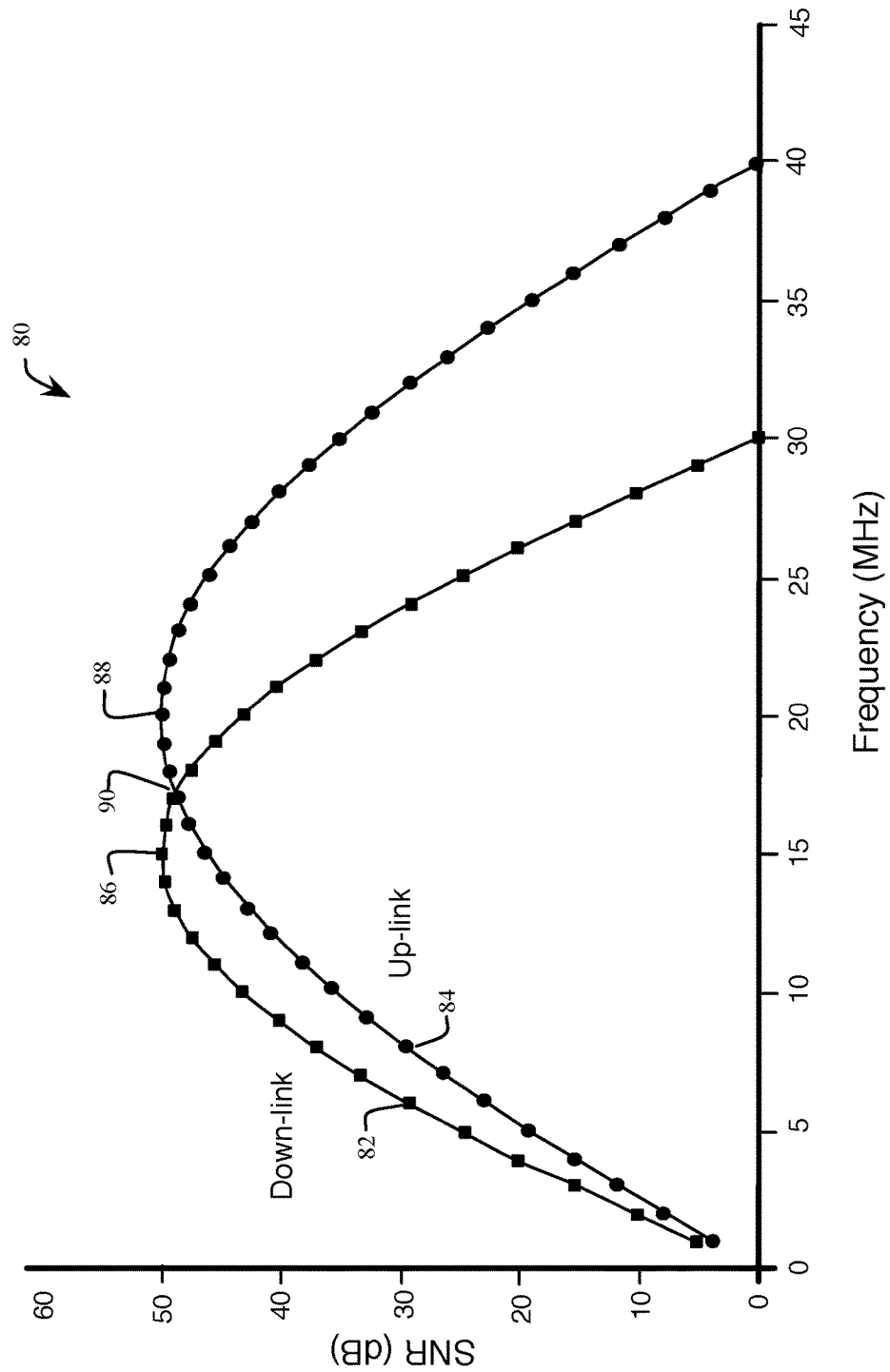
FIG. 5 is a graphical view of results from the UGOLE method of FIG. 4.

In one embodiment, a profile of SNR values versus frequency as shown in in FIG. 5 (and similarly a profile of signal strength versus frequency) is obtained by iteratively performing each of the steps at 68 through 76 for a single transceiver frequency, starting with a lowest transceiver frequency, then incrementing the transceiver frequency, and repeating steps 68 through 76 until the profile is complete. In another embodiment, the steps 68 through 76 begin with the highest transceiver frequency, with the transceiver frequency decremented until the profile is complete. In another embodiment, each transceiver frequency is transmitted with a corresponding SNR and signal level recorded at each of the steps 68 through 76, before proceeding to the next step.

In various embodiments, the range of transceiver frequencies to be used in the UGOLE operation are predetermined in setup parameters, which are identical for both the slave and master transceivers. Upon completion of the steps 68 through 76, the master includes a profile of SNR and signal strengths over a predetermined range of frequencies for transmission in either direction between the master transceiver 12 and the slave transceiver 26.

Referring to FIG. 5, a profile 80 of SNR versus frequency is shown for a down-link 82, where transmission occurs from the slave transceiver 26 to the master transceiver 12, and for an up-link 84, where transmission occurs from the master transceiver 12 to the slave transceiver 26. At 78, the UGOLE operation is completed by determining an optimal transceiver frequency based on as least one of the stored SNR and signal strengths from the bilateral communication between the master and the slave. For intelligible communications, SNR has been found to be a more important metric to optimize rather than signal strength. As shown in FIG. 5, the best down-link frequency 86 and the best up-link frequency 88 may be different. In this case, the master transceiver 12 chooses one of the best down-link frequency 86, the best up-link frequency 88, the intersecting point 90, or an average of the best down-link frequency 86 and the best up-link frequency 88.

Figure 6:
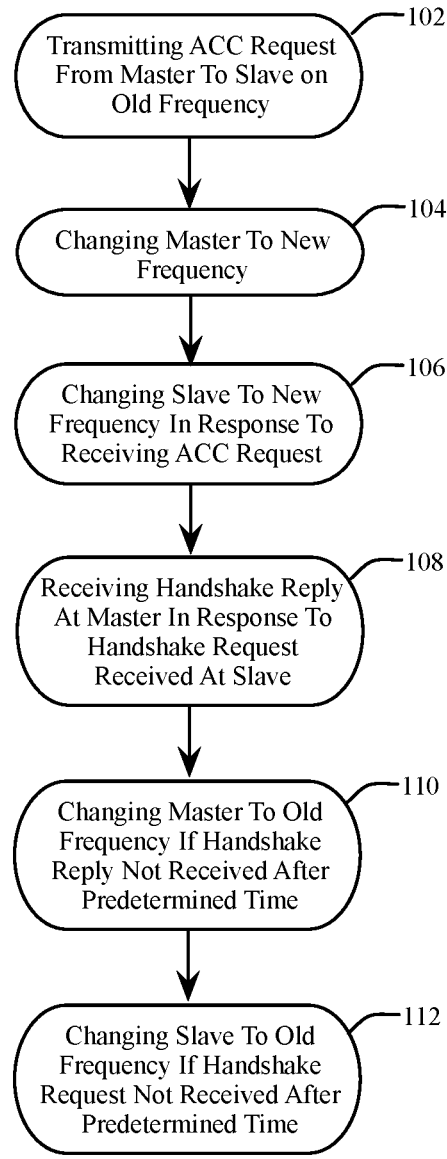
FIG. 6 is a flowchart representation of a method for Automatic Channel Control (ACC) in accordance with an embodiment of the present disclosure.

Once an optimal frequency is determined by the master transceiver 12 from the UGOLE operation shown in FIG. 4 and FIG. 5, the slave transceiver 26 is required to re-tune to the same optimal frequency for communication between the two transceivers. In another example, the master transceiver 12 changes to a new frequency to improved security, thus requiring the corresponding slave transceiver 26 to re-tune to the new frequency. With reference to FIG. 1 and FIG. 6, an ACC process is described for synchronizing the transceiver frequencies between a master and a slave transceiver. ACC is a method where one radio transceiver sends a specially coded analog or digital radio signal on the current channel being used (e.g. on the current transceiver frequency). This coded signal instructs all of the slave radio transceivers within reception range to switch to a new frequency and re-tune. In one embodiment, ACC is initiated by any radio transceiver within communication range. In another embodiment, ACC is initiated by the radio designated as a master radio (e.g., the master transceiver 12 of FIG. 1). Once the frequency has been changed, a set of handshaking tones are used to verify two-way communications on the new frequency.

Referring to FIG. 1 and FIG. 6, at 102, the master transceiver 12 transmits an ACC request to the slave transceiver 26 on an old frequency. At 104, the master transceiver 12 is switched to a new frequency (e.g., as determined by the UGOLE operation). At 106, the slave transceiver 26 is changed to the new frequency in response to receiving the ACC request. At 108, a handshake request is sent from the master transceiver 12 to the slave transceiver 26. Upon receiving the handshake request, the slave transceiver 26 sends a handshake reply to the master transceiver 12. If the handshake is not successful, the master and slave transceivers will revert to the old frequency after a predetermined time. Specifically, at 110, the master transceiver 12 is switched from the new frequency to the old frequency if the handshake reply is not received by the master after a predetermined time. At 112, the slave transceiver 26 is switched from the new frequency to the old frequency if the handshake request is not received by the slave after a predetermined time. Additionally, the slave transceiver 26 remains on the old frequency if the slave never receives the ACC request. In various embodiments, the predetermined time is stored in the respective master and slave transceivers.

After the transceiver frequency is changed, as a result of the UGOLE operation in one example, the master transceiver 12 and corresponding slave transceiver 26 will have an impedance mismatch between their respective antennas and transceivers. In another example, the impedance mismatch occurs as a result of moving through a cave, through water, or through a collapsed structure. In another example, the impedance mismatch occurs from a change in the environment including, but not limited to, movement of objects on the subsurface 24 or interfering electromagnetic (EM) fields from other radio devices.

In one example embodiment, the auto-tuner on the radio transceiver looks at the antenna impedance match on an interrupt basis, whenever a communication broadcast is initiated. If the tuning parameters exceed a predetermined level of mismatch, the radio interrupts the transmission and re-tunes itself.

In another embodiment, the radio can periodically test tuning on a polling basis, (e.g., once a minute), in environments where the user is in a mobile mode and, for example, is moving through spatially changing geologies. When needed, the radio then re-tunes itself and would likely be nearly always ready for an un-interrupted radio broadcast.

The polling based check circuit sends a periodic pulse of RF energy, at programmed time intervals, and at very low power levels (e.g., a few mW, for a few mS disabling the receiver) on the transceiver frequency. The circuit would sense and measure the reflected current and voltage, (including a level and phase), then calculate the complex impedance presented to the transmitter side of the impedance matching circuit. Decisions on the magnitude of mismatch allowed would be programmed to trigger an adjustment to the tuner circuit when out of bounds and re-test (e.g., when a difference between the antenna impedance and the transceiver impedance exceeds an impedance mismatch value).

The polling based check circuit would have information from the transceiver regarding the currently used parameters that the tune circuit is using for a match, and therefore, fast prediction of the parameters to solve the mismatch will be used. The very low power output and short duration of the polling based check circuit would not interfere with normal operations, which generally occur at a much higher rate. During normal transmit periods, the polling based check circuit would be disabled, and the interrupt based circuit would be used to test and adjust the impedance matching parameters, (e.g., inductor and capacitor combinations), if required.

Conventionally, transceivers operating in the range of 2 MHz to 150 Mhz have required an antenna being at least 25% of the free space wavelength corresponding to the transceiver frequency to maintain sufficient efficiency for reliable communication. By dynamically adapting the transceiver frequency and antenna tuning, the inventors have realized a reliable method and apparatus for radio communication that works in otherwise harsh subsurface environments, with subwavelength antennas. Specifically, antennas with the freespace wavelength as short as $\frac{1}{1000}$ (0.1%) have been used for successful communication through approximately 15 meters of Martin Formation Limestone with a lateral offset of 80 meters (e.g. a distance between transceivers of 81.4 meters). Additionally, two-way communications was demonstrated over a range of 0.4 Km using an antenna that was 0.2% of the freespace wavelength, consuming 5 Watts with a transceiver frequency of 4.355 Mhz.

FIG. 7 through FIG. 53 provide numerous use cases and example embodiments of the subsurface radio transceiver (also referred to as through-the-earth radios) for illustrative purposes, but should not be construed as limiting the applicability of the teachings disclosed herein.

Figure 7:
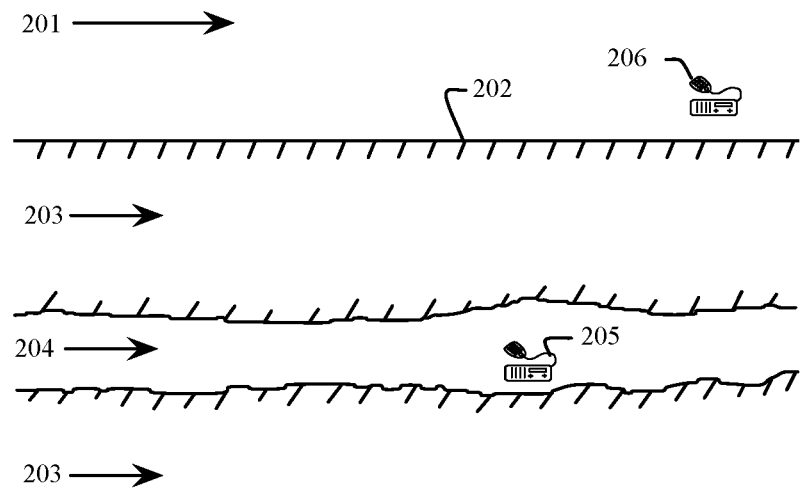
FIG. 7 is a cross sectional view of a subsurface through-the-earth radio system showing communications linkage between a surface transceiver and an underground transceiver with the transceiver antennas omitted for the sake of simplicity.

Referring now to the invention in more detail, in FIG. 7 there is shown a cross sectional view of the earth with atmosphere 201 and the earth-atmosphere boundary 202 indicated. The subsurface of the earth 203 exists below the earth-atmosphere boundary 202. A subterranean void 204 can be caves, mines, tunnels, basements, underground facilities, sewers, drainage systems, karez, qanat, crawlways, subway systems, earth fissures, sinkholes, utility networks, and storage systems. A through-the-earth radio communications system can provide bi-directional communications between a transceiver 206 located on the surface of the earth 202 and a transceiver 205 positioned in a subterranean location 204. Said transceiver 205 is shown without an antenna attachment for sake of simplicity and because of the large variety of antenna options.

Figure 8:
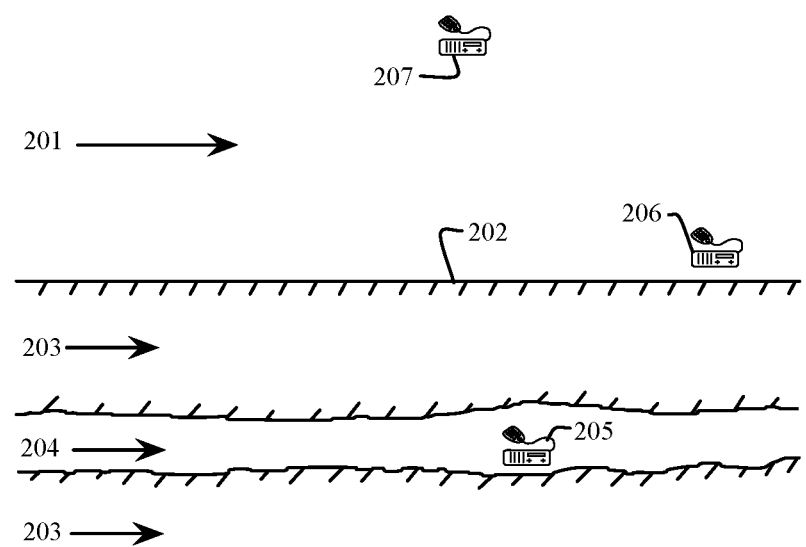
FIG. 8 is a cross sectional view of a subsurface through-the-earth radio system showing communications linkage between an elevated, above-surface, transceiver and an underground transceiver.

Referring now to the invention in more detail, in FIG. 8 the location of the transceiver in FIG. 7 is altered to show an elevated location above the surface of the earth 202 for the transceiver 207. This could represent elevated man-made or natural structures above the earth.

Figure 9:
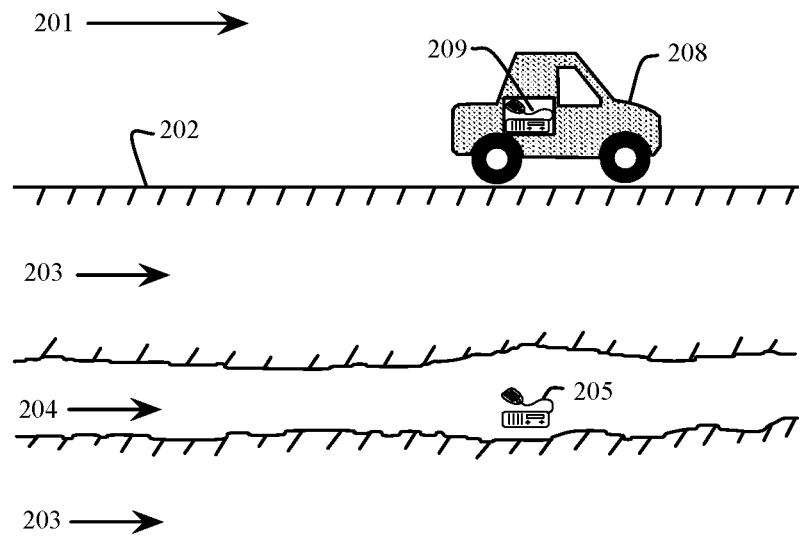
FIG. 9 is a cross sectional view of a subsurface through-the-earth radio system showing communications linkage between a surface, vehicle-carried, transceiver and an underground transceiver.

In more detail, still referring to the invention of FIG. 7, FIG. 9 shows the surface transceiver 209 carried or mounted in a vehicle 208 for vehicular communications with the subsurface transceiver 205.

Figure 10:
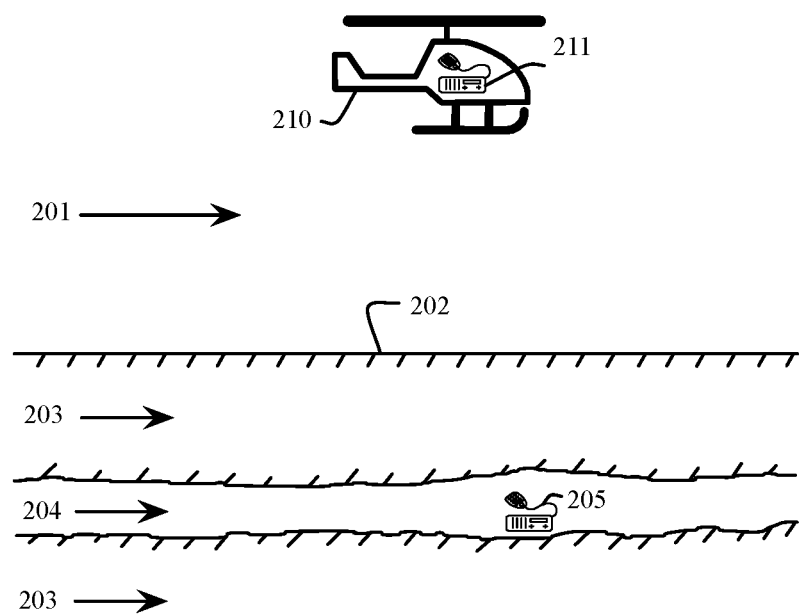
FIG. 10 is a cross sectional view of a subsurface through-the-earth radio system showing communications linkage between an aircraft-carried transceiver and an underground transceiver.

In more detail, still referring to the invention of FIG. 7, FIG. 10 shows the surface transceiver 211 carried or mounted in an aircraft 210 for airborne communications with the subsurface transceiver 205.

Figure 11:
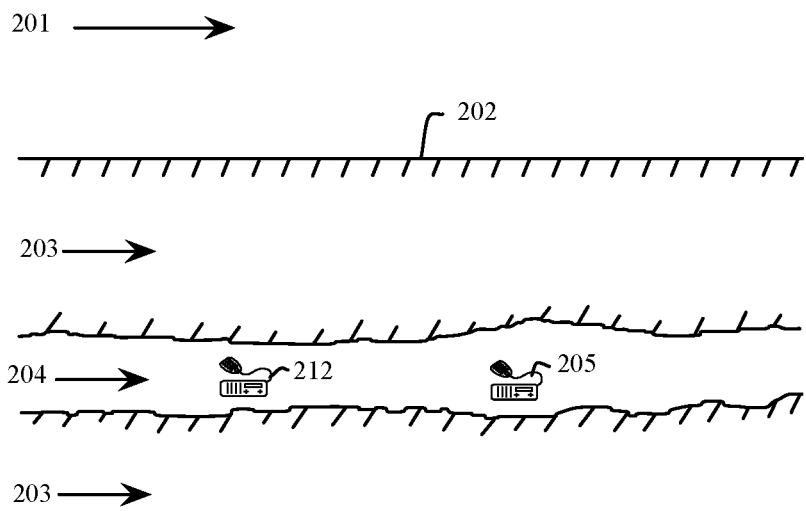
FIG. 11 is a cross sectional view of a subsurface through-the-earth radio system showing communications linkage between two underground transceivers.

In more detail, still referring to the invention of FIG. 7, FIG. 11 shows the subsurface transceiver 205 and an additional subsurface transceiver 212 for subsurface to subsurface communications.

Figure 12:
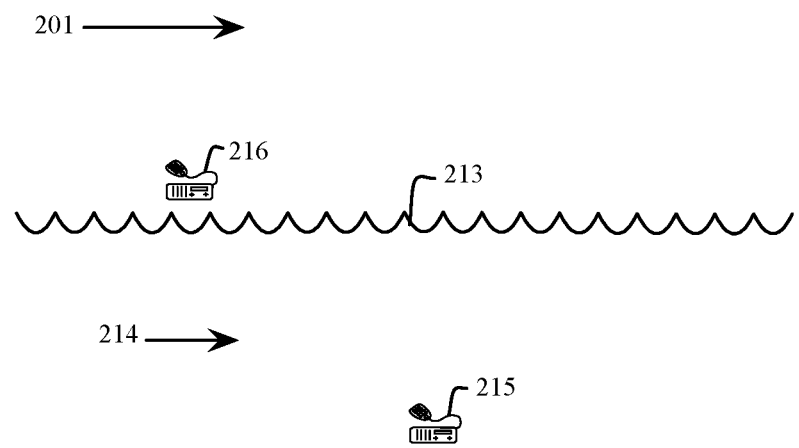
FIG. 12 is a cross sectional view of a subsurface through-the-earth radio system showing communications linkage between a water's surface transceiver and an underwater transceiver.

Referring now to the invention in more detail, in FIG. 12 there is shown a cross sectional view of a body of water on the earth with atmosphere 201 and the atmosphere-water boundary 213 indicated. In this instance, the subsurface of the earth is water 214 that exists below the atmosphere-water boundary 213. A through-the-earth radio communications system can provide bi-directional communications between a transceiver 216 located on the surface of the water 213 and a transceiver 215 positioned in the body of water 214.

Figure 13:
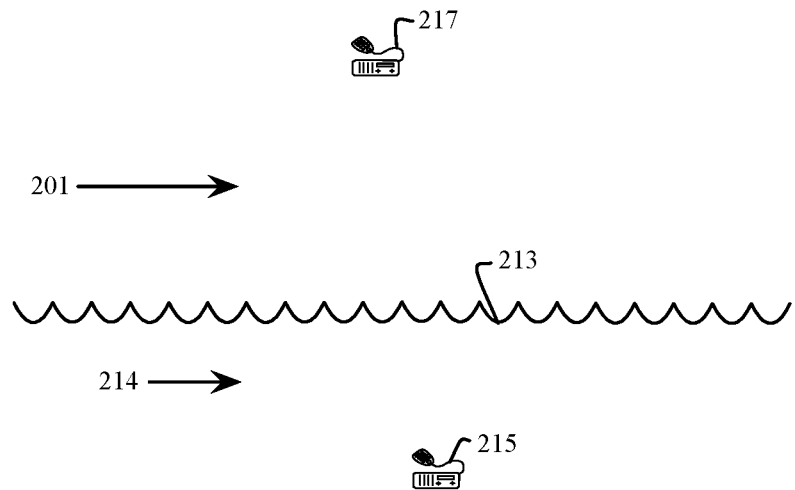
FIG. 13 is a cross sectional view of a subsurface through-the-earth radio system showing communications linkage between an elevated, above-water-surface, transceiver and an underwater transceiver.

In more detail, still referring to the invention of FIG. 12, FIG. 13 shows the location of the transceiver altered to show an elevated location above the surface of the water 213 for the transceiver 217. This could represent elevated man-made or natural structures above the water.

Figure 14:
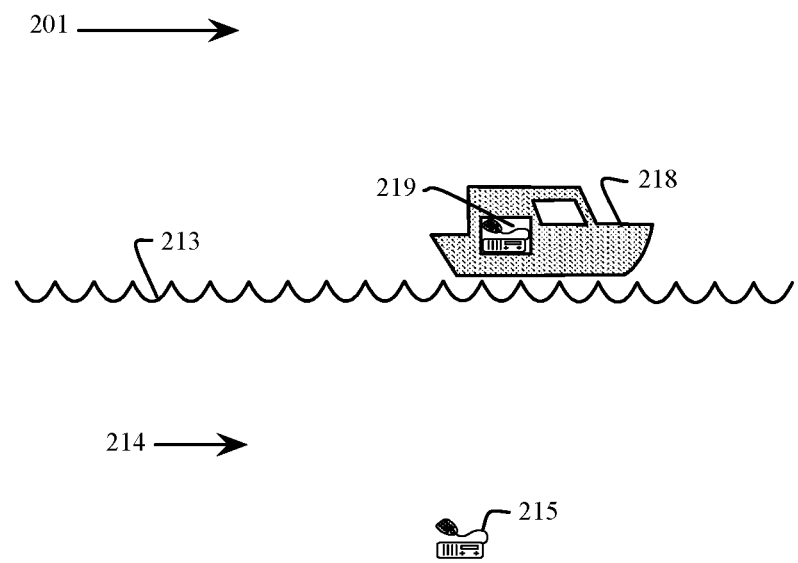
FIG. 14 is a cross sectional view of a subsurface through-the-earth radio system showing communications linkage between a marine-vessel-carried surface transceiver and an underwater transceiver.

In more detail, still referring to the invention of FIG. 12, FIG. 14 shows the surface transceiver 219 carried or mounted in a marine vessel 218 for communications with the subsurface transceiver 215 located in water.

Figure 15:
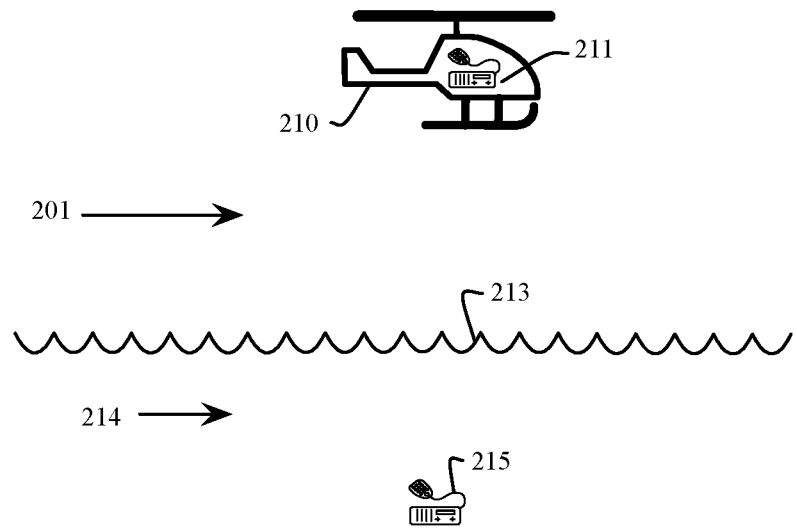
FIG. 15 is a cross sectional view of a subsurface through-the-earth radio system showing communications linkage between an aircraft-carried transceiver and an underwater transceiver.

In more detail, still referring to the invention of FIG. 12, FIG. 15 shows the surface transceiver 211 carried or mounted in an aircraft 210 for communications from the aircraft to the subsurface transceiver 215 located in water.

Figure 16:
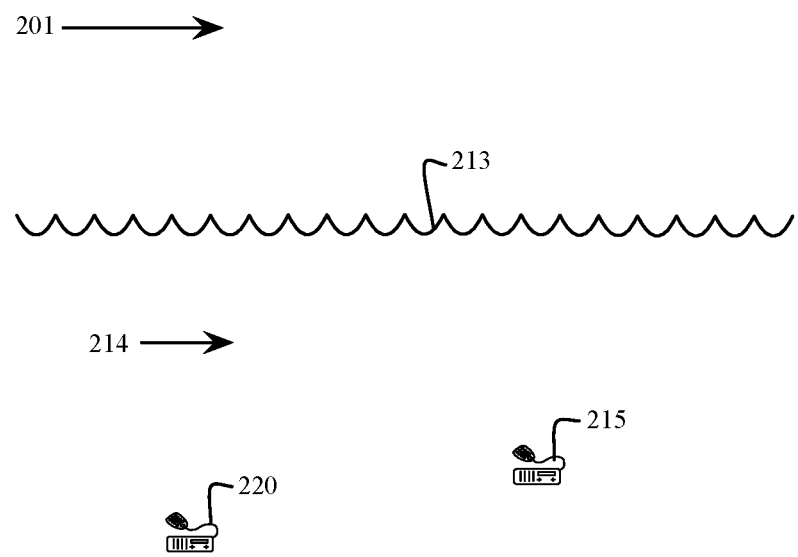
FIG. 16 is a cross sectional view of a subsurface through-the-earth radio system showing communications linkage between two underwater transceivers.

In more detail, still referring to the invention of FIG. 12, FIG. 16 shows the subsurface transceiver 215 and an additional subsurface transceiver 220 for subsurface to subsurface communications in water.

Figure 17:
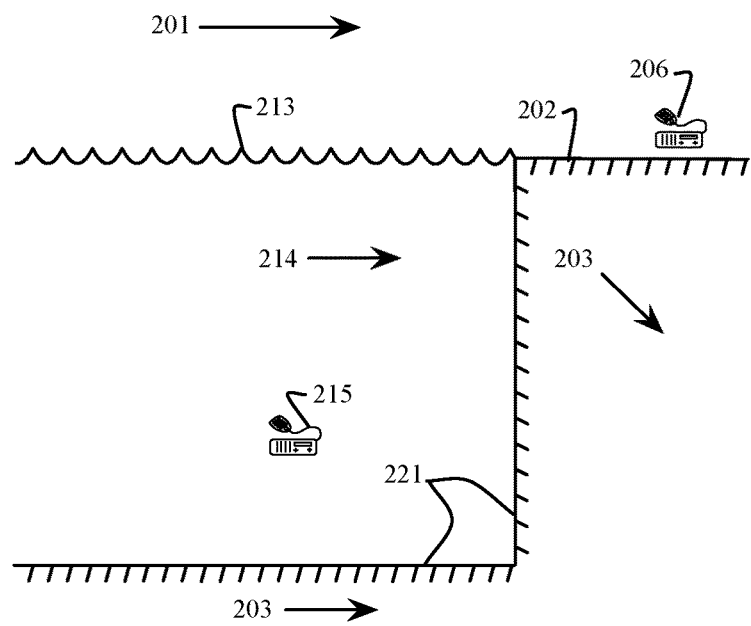
FIG. 17 is a cross sectional view of a subsurface through-the-earth radio system showing communications linkage between an underwater transceiver and a transceiver located on land.

Referring now to the invention in more detail, in FIG. 17 there is shown a cross sectional view of a body of water on the earth with atmosphere 201 and the atmosphere-water boundary 213 indicated. Also shown in this figure is a water-land interface 221. In this instance, the subsurface of the water 214 exists below the atmosphere-water boundary 213. The subsurface of land 203 exists beneath the atmosphere-land boundary 202. A through-the-earth radio communications system can provide bi-directional communications between a transceiver 206 located on the surface of the land 202 and a transceiver 215 positioned in the body of water 214.

Figure 18:
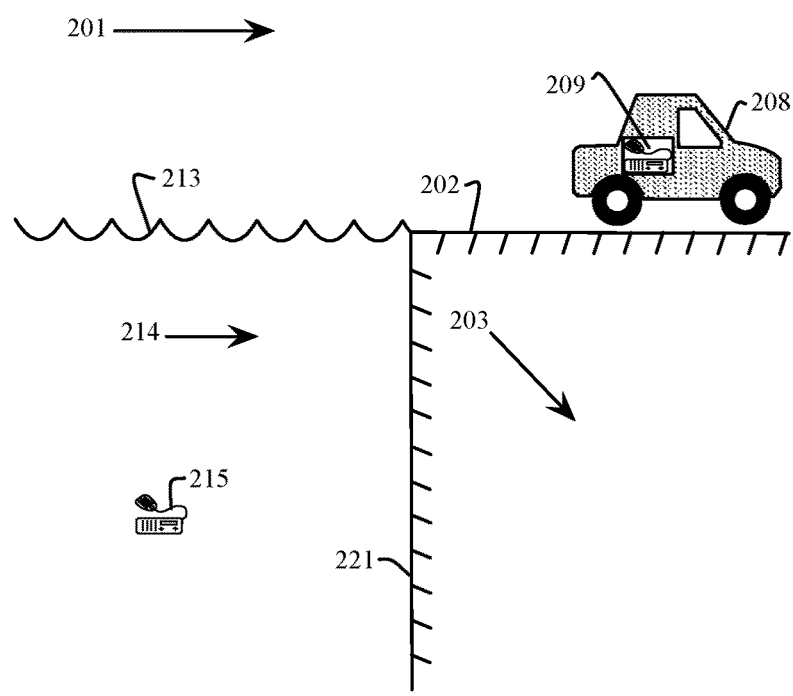
FIG. 18 is a cross sectional view of a subsurface through-the-earth radio system showing communications linkage between an underwater transceiver and a vehicle-carried transceiver located on land.

In more detail, still referring to the invention of FIG. 17, FIG. 18 shows the surface transceiver 209 carried or mounted in a vehicle 208 for vehicular communications with the subsurface transceiver 215 located in a body of water 214.

Figure 19:
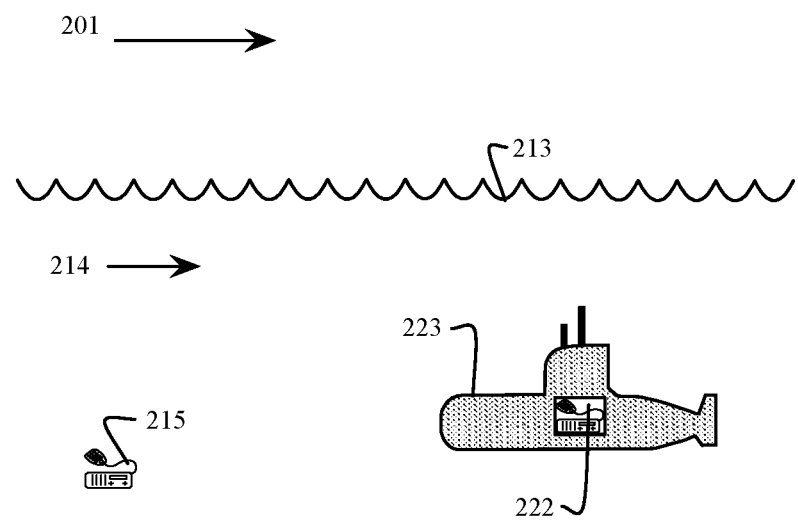
FIG. 19 is a cross sectional view of a subsurface through-the-earth radio system showing communications linkage between a, underwater, submersible-vessel-carried transceiver and an underwater transceiver.

In more detail, still referring to the invention of FIG. 17, FIG. 19 shows an underwater transceiver 222 carried or mounted in a submersible vessel 223 for underwater communications with the subsurface transceiver 215.

Figure 20:
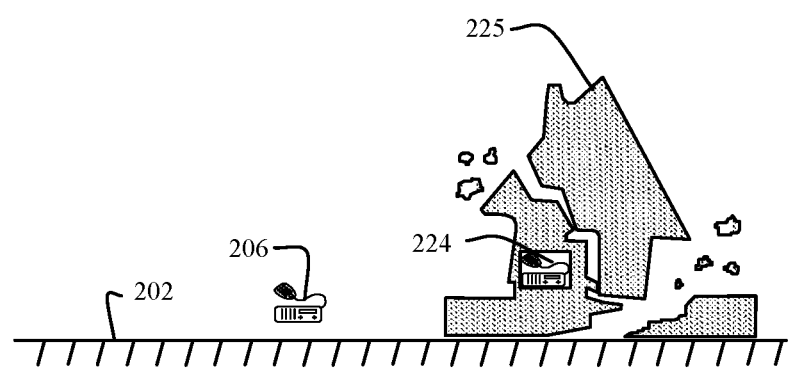
FIG. 20 is a cross sectional view of a subsurface through-the-earth radio system showing communications linkage between a transceiver located in the interior of a collapsed structure and a transceiver located on land and external to the collapsed structure.

Referring now to the invention in more detail, in FIG. 20 there is shown a cross sectional view of a collapsed structure 225, either natural or man-made, located on the surface of the earth 202. A through-the-earth radio communications system can provide bi-directional communications between a transceiver 206 located on the surface of the land 202 and a transceiver 224 positioned in the interior of the collapsed structure.

Figure 21:
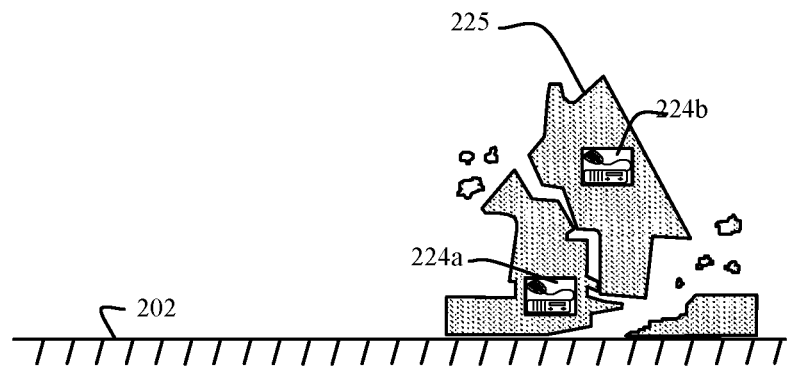
FIG. 21 is a cross sectional view of a subsurface through-the-earth radio system showing communications linkage between a two transceivers, both located in the interior of a collapsed structure.

In more detail, still referring to the invention of FIG. 20, FIG. 21 shows a transceiver 224a located within the collapsed structure 225 that can communicate with second transceiver 224b located in the same or different collapsed structure.

Figure 22:
FIG. 22 is a cross sectional view of a subsurface through-the-earth radio system showing communications linkage between a transceiver, located in the interior of a collapsed structure and an elevated, above surface, transceiver.
Figure 22:
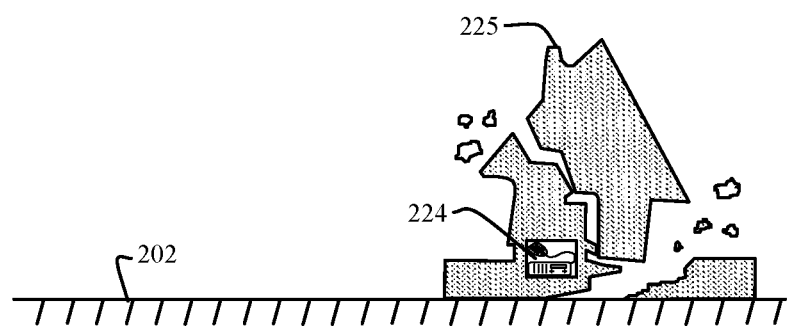

In more detail, still referring to the invention of FIG. 20, FIG. 22 shows the location of the transceiver 207 is altered to show an elevated location above the surface of the earth 202. This could represent elevated man-made or natural structure above the earth. This allows communications between an elevated location 207 and the transceiver 224 located within a collapsed structure 25.

Figure 23:
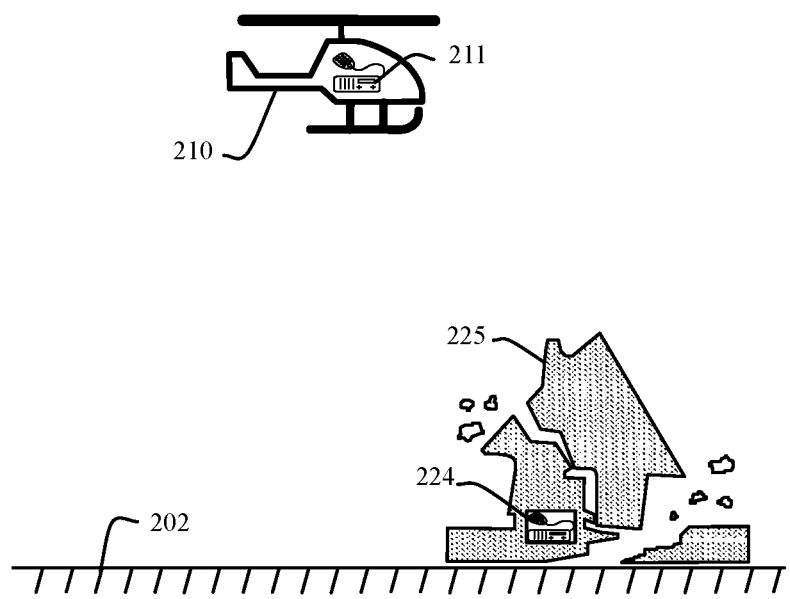
FIG. 23 is a cross sectional view of a subsurface through-the-earth radio system showing communications linkage between a transceiver, located in the interior of a collapsed structure, and an aircraft-carried transceiver.

In more detail, still referring to the invention of FIG. 20, FIG. 23 shows a transceiver 211 carried or mounted in an aircraft 210 for communications from the aircraft to a transceiver 224 located in the interior of a collapsed structure 225.

Figure 24:
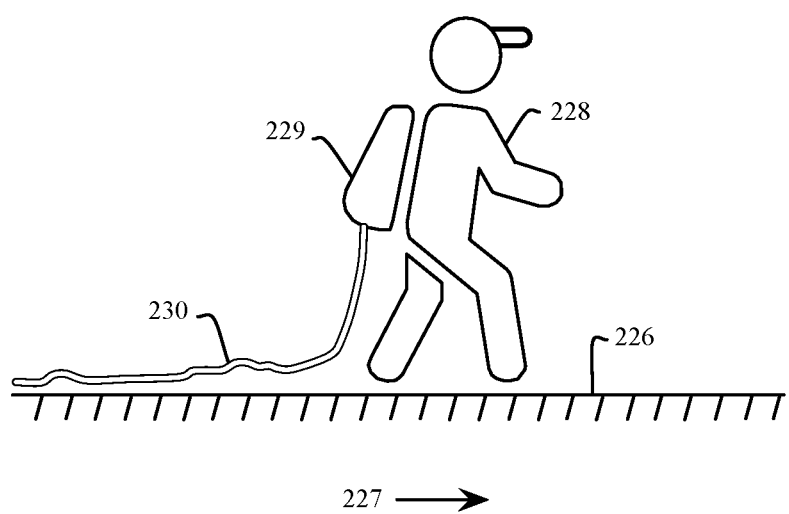
FIG. 24 shows a human, using a backpack-carried a subsurface through-the-earth radio transceiver, and a trailing antenna cable.

Referring now to the invention in more detail, in FIG. 24 there is shown a cross sectional view of a human 228 walking, standing, or sitting, on a unspecified surface 226 covering an unspecified material 227. In this figure, the human 228 is carrying a backpack 229 that encloseres a through-the-earth radio transceiver. A trailing antenna 230 egresses from the bottom of the backpack 229 and trails behind the human 228.

Figure 25:
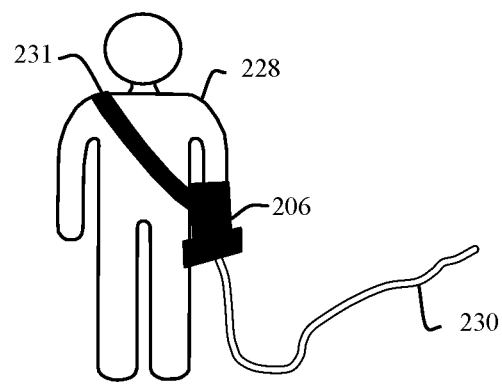
FIG. 25 shows a human, using a shoulder-strap-carried a subsurface through-the-earth radio transceiver.

Referring now to the invention in more detail, in FIG. 25 there is shown a view of a human 228 walking, standing, or sitting. In this figure, the human 228 is carrying a transceiver 206 that is carried using a shoulder strap or harness 231. A trailing antenna 230 the attached to the bottom of the transceiver 206 and trails behind the human 228.

Figure 26:
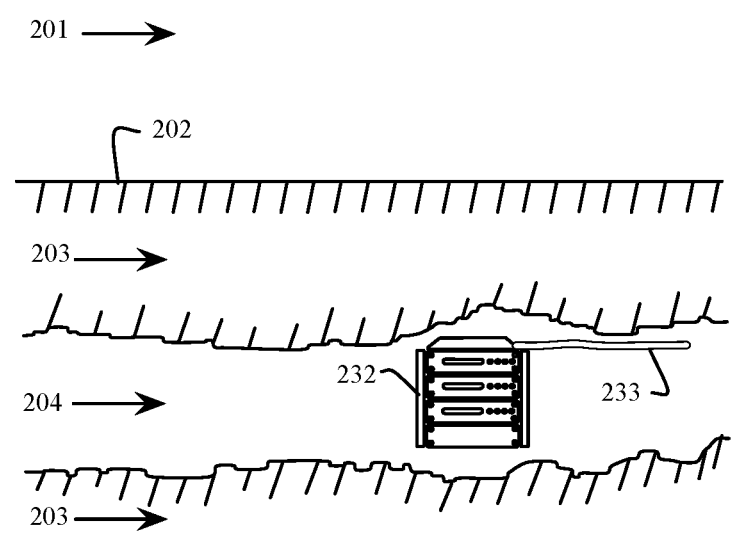
FIG. 26 is a cross sectional view showing a subsurface through-the-earth radio base station transceiver and antenna deployed underground.

Referring now to the invention in more detail, in FIG. 26 there is shown a cross sectional view of the earth with atmosphere 201 and the earth-atmosphere boundary 202 indicated. The subsurface of the earth 203 exists below the earth-atmosphere boundary 202. A subsurface void (e.g., a subterranean void in one example) 204 can be caves, mines, tunnels, basements, underground facilities, sewers, drainage systems, karez, qanat, crawlways, subway systems, earth fissures, sinkholes, utility networks, and storage systems. A through-the-earth radio communications base station 232 can be permanently or temporarily positioned either on or above the earth's surface 202, or positioned in the subsurface void 204 as depicted in FIG. 26. A temporary or permanent antenna 233 can be attached to the base station 232.

Figure 27:
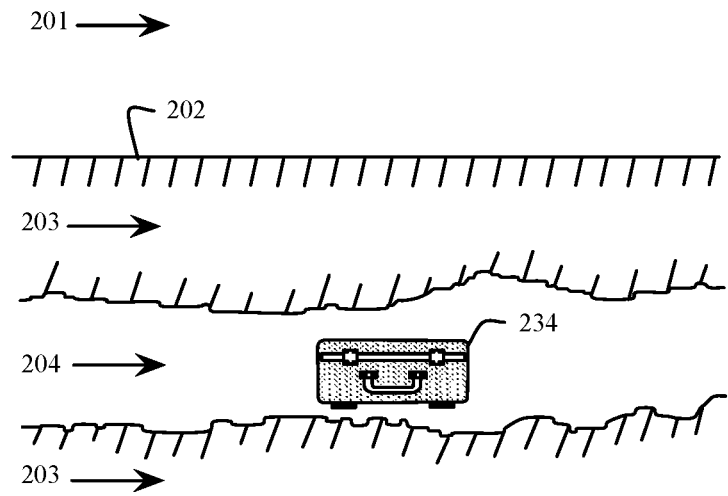
FIG. 27 is a cross sectional view showing a subsurface through-the-earth radio transceiver(s) deployed in a pre-positioned underground cache.

Referring now to the invention in more detail, in FIG. 27 there is shown a cross sectional view of the earth with atmosphere 201 and the earth-atmosphere boundary 202 indicated. The subsurface of the earth 203 exists below the earth-atmosphere boundary 202. A subsurface void 204 is shown. A through-the-earth radio communications transceiver equipment set can be sealed in a long-term storage unit 234 (cached) in the subsurface void 204 for use in emergencies.

Figure 28:
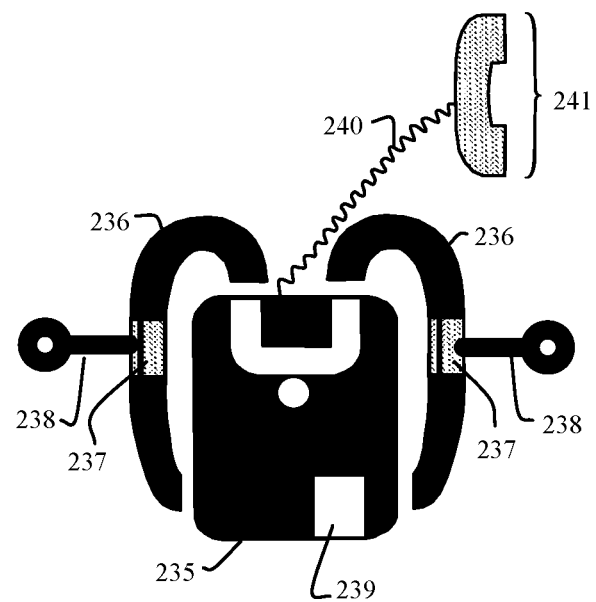
FIG. 28 shows a subsurface through-the-earth radio transceiver backpack.

Referring now to the invention in more detail, in FIG. 28 there is shown a backpack enclosure 235 used for mobile operation of the through-the-earth communications transceiver. Backpack straps 236 secure the backpack to the wearer. A quick-release mechanism 237 is an integral part of the backpack straps 236. Pulling on the quick release lanyard 238 will immediately allow the user to shed the backpack 235. The transceiver's trailing antenna exits the backpack 235 by way of a re-closable access panel 239 located in the bottom of the backpack 235. While wearing the backpack 235 containing a transceiver, the user can communicate using the handset 241. The handset 241 is attached to the transceiver via an umbilical cable 240. The handset 241 contains a Push-To-Talk (PTT) button.

Figure 29:
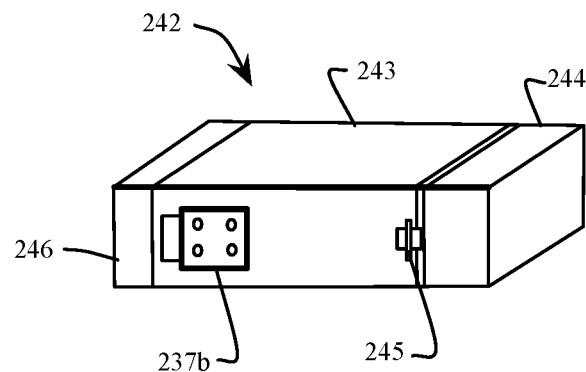
FIG. 29 shows a perspective view of a subsurface through-the-earth radio transceiver.

Referring now to the invention in more detail, in FIG. 29 there is shown a through-the-earth radio transceiver 242. Sections of the transceiver 242 include the electronics section 243 that contain the preamplifiers, filters, matching circuits, power amplifiers, digital signal processing electronics, encryption, data modems, oscillators, and other standard radio elements. A removable battery pack 244 is removed by unlatching the battery case latches 245. The front panel 246 contains the user controls, radio display, antenna connector, data connector, and handset connector. Mechanical attachment point 237b allows suspension of the transceiver by a shoulder strap or harness.

Figure 30:
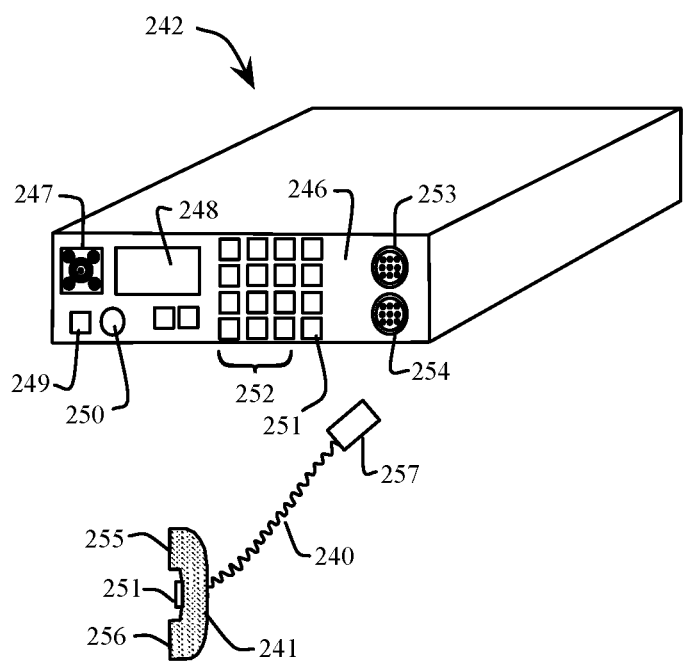
FIG. 30 shows a perspective view of a subsurface through-the-earth radio transceiver that utilizes a simple handset and front panel radio controls and display.

In more detail, still referring to the invention of FIG. 29, FIG. 30 shows the front panel 246 of transceiver 242. The front panel has an electrical connector 247 for connection of a antenna to the transceiver 242. The front panel also has a display 248 for user interaction with the transceiver 242. Push button 249 is used for power on and off. A panel speaker 250 is mounted on the front panel 246. Other user push buttons 252 are used for user control of the transceiver 242. Up-down buttons 251 are used to set transceiver functions. The transceiver handset 241 is connected to the transceiver front panel 246 using front panel connector 253 and the handset 241 umbilical cable 240 connector 257. The handset 241 contains a microphone 256 and a speaker 255. The handset 241 contains a Push-To-Talk (PTT) button. Panel connector 254 is used for external power, programming, and data modem functions.

Figure 31:
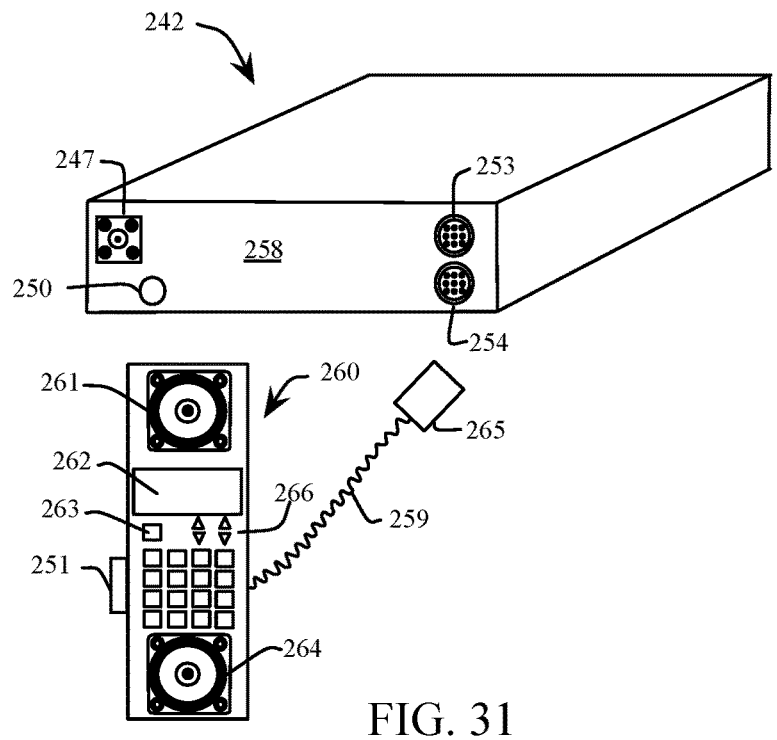
FIG. 31 shows a perspective view of a subsurface through-the-earth radio transceiver that utilizes a complex handset that contains the radio controls and display.

In more detail, still referring to the invention of FIG. 29, FIG. 31 shows another version of transceiver 242 where the front panel 258 is greatly simplified to allow access to user controls from an advanced handset 260. The front panel has an electrical connector 247 for connection of the trailing antenna to the transceiver 242. The transceiver's advanced handset 260 is connected to the transceiver front panel 258 using front panel connector 253 and the handset 260 umbilical cable 249 connector 265. The handset 260 contains a microphone 264 and a speaker 261. Panel connector 254 is used for external power, programming, and data modem functions. The advanced handset 260 has a display 262 for user interaction with the transceiver 242. Push buttons 263 are used for power on and off and for user control of the transceiver 242. A panel speaker 250 is mounted on the front panel 258. Up-down buttons 266 are used to set transceiver functions.

Figure 32:
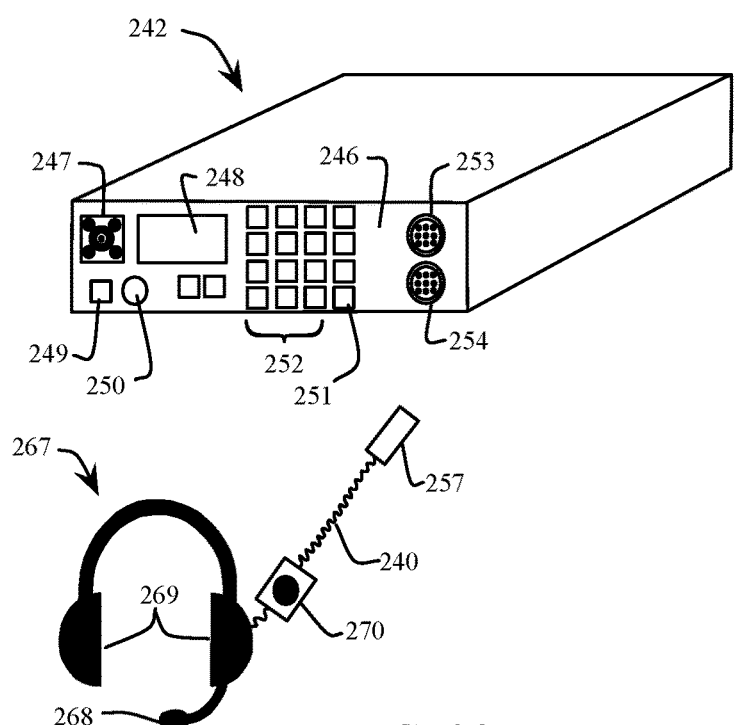
FIG. 32 shows a perspective view of a subsurface through-the-earth radio transceiver that utilizes a headset and front panel radio controls and display.

In more detail, still referring to the invention of FIG. 29, FIG. 32 shows the front panel 246 of transceiver 242. The front panel has an electrical connector 247 for connection of an antenna to the transceiver 242. The front panel also has a display 248 for user interaction with the transceiver 242. Push button 249 is used for power on and off. A panel speaker 250 is mounted on the front panel 246. Other user push buttons 252 are used for user control of the transceiver 242. Up-down buttons 251 are used to set transceiver functions. The transceiver headset 267 is connected to the transceiver front panel 246 using front panel connector 253 and the headset 267 umbilical cable 240 connector 257. The headset 267 contains a microphone 268 and a pair of headphone speakers 269. A Push-To-Talk (PTT) button 270 is depressed when the user wants to key the microphone. Panel connector 254 is used for external power, programming, and data modem functions.

Figure 33:
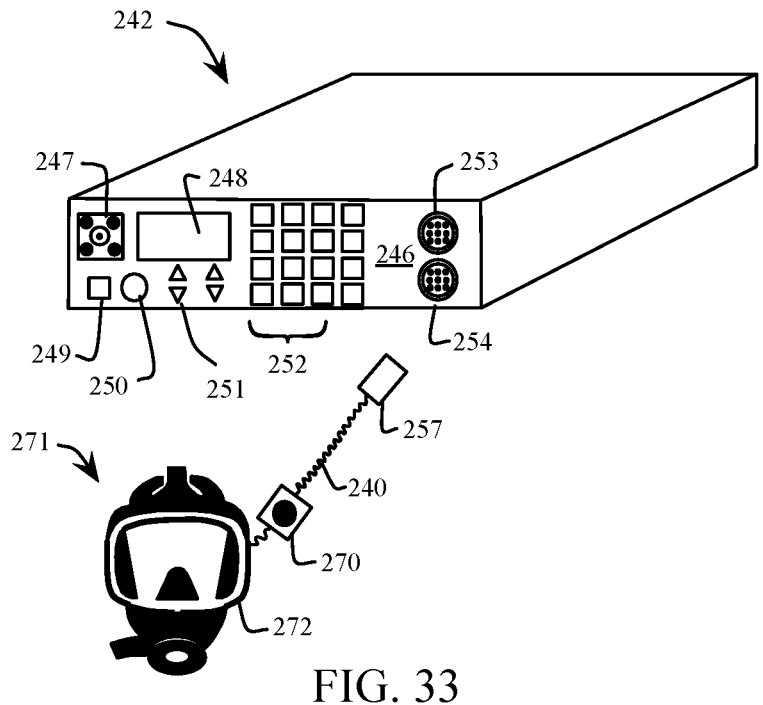
FIG. 33 shows a perspective view of a subsurface through-the-earth radio transceiver that utilizes a headset located within a breathing apparatus and front panel radio controls and display.

In more detail, referring to the invention of FIG. 32, FIG. 33 shows the front panel 246 of transceiver 242. The front panel has an electrical connector 247 for connection of an antenna to the transceiver 242. The front panel also has a display 248 for user interaction with the transceiver 242. Push button 249 is used for power on and off. A panel speaker 250 is mounted on the front panel 246. Other user push buttons 252 are used for user control of the transceiver 242. Up-down buttons 251 are used to set transceiver functions. The transceiver headset 271 is connected to the transceiver 242 front panel 246 using front panel connector 253 and the headset 271 umbilical cable 240 connector 257. The headset 271 contains a microphone 268 (not shown) and a pair of headphone speakers 272. A Push-To-Talk (PTT) button 270 is depressed when the user wants to key the microphone. Panel connector 254 is used for external power, programming, and data modem functions.

Figure 34:
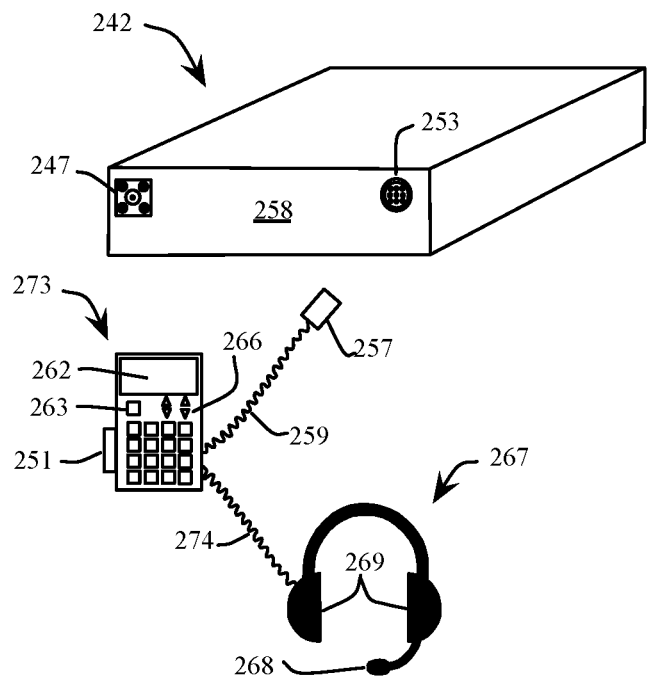
FIG. 34 shows a perspective view of a subsurface through-the-earth radio transceiver that utilizes a detached external radio controller containing radio controls and a display along with a headset.

In more detail, referring to the invention of FIG. 31, FIG. 34 shows the front panel 258 of transceiver 242. The front panel has an electrical connector 247 for connection of an antenna to the transceiver 242. An external display and control box 273 is connected to the transceiver 242 front panel 258 using front panel connector 253 and the control box 273 umbilical cable 259 connector 265. The control box 273 also has a display 262 for user interaction with the transceiver 242. Push buttons 263 are used for user control of the transceiver 242. Up-down buttons 266 are used to set transceiver functions. The transceiver headset 267 is connected to the control box 273 using the umbilical cable 274. The headset 267 contains a microphone 268 and a pair of headphone speakers 269. A Push-To-Talk (PTT) button 251 is located on the control box 273 and is depressed when the user wants to key the microphone 268.

Figure 35:
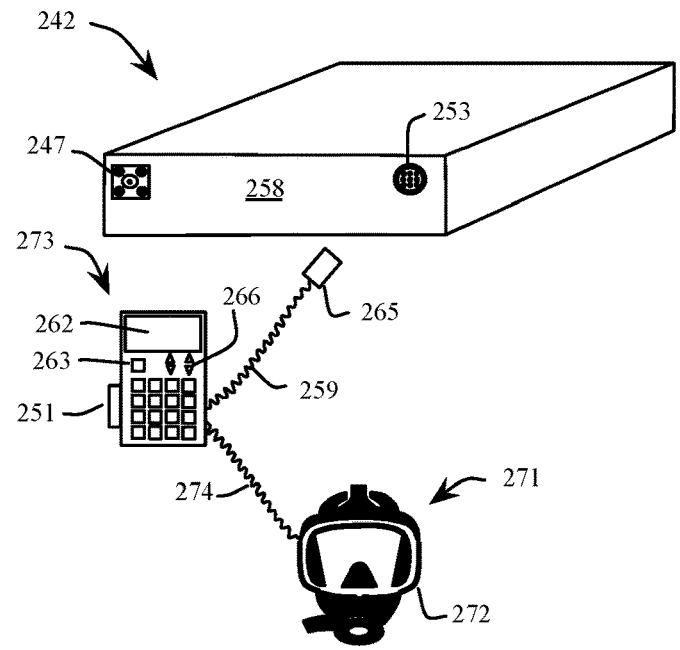
FIG. 35 shows a perspective view of a subsurface through-the-earth radio transceiver that utilizes, a detached external radio controller containing radio controls and a display along with a headset located within a breathing apparatus.

In more detail, referring to the invention of FIG. 31, FIG. 35 shows the front panel 258 of transceiver 242. The front panel has an electrical connector 247 for connection of an antenna to the transceiver 242. An external display and control box 273 is connected to the transceiver 242 front panel 258 using front panel connector 253 and the control box 273 umbilical cable 259 connector 265. The control box 273 also has a display 262 for user interaction with the transceiver 242. Push buttons 263 are used for user control of the transceiver 242. Up-down buttons 266 are used to set transceiver functions. The transceiver headset 271 is embedded within the facemask of a self-contained breathing apparatus (SCBA), which allows a user to use the through-the-earth radio system while wearing a SCBA facemask. The transceiver headset 271 is connected to the control box 273 using the umbilical cable 274. The SCBA headset 271 contains a microphone (not shown) and a pair of headphone speakers 272. A Push-To-Talk (PTT) button 251 is located on the control box 273 and is depressed when the user wants to talk on the radio.

Figure 36:
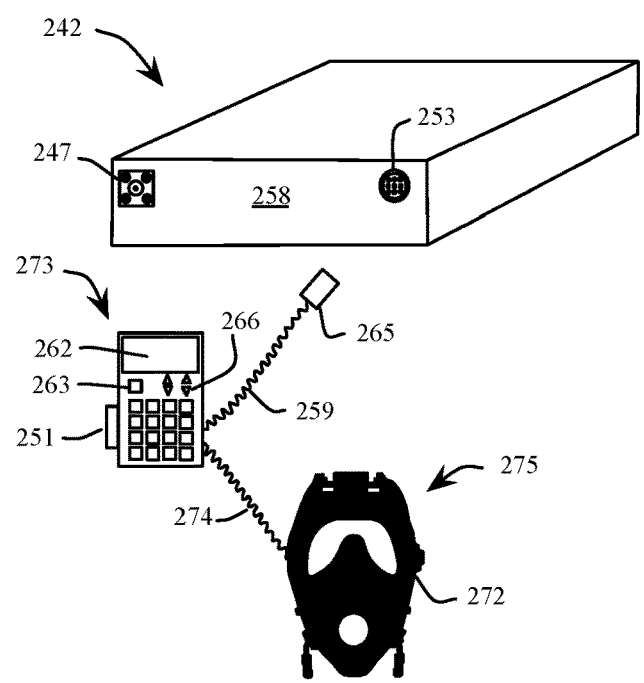
FIG. 36 shows a perspective view of a waterproof subsurface through-the-earth radio transceiver that utilizes a detached waterproof external radio controller containing radio controls and a display along with a headset located within an underwater breathing apparatus.

In more detail, referring to the invention of FIG. 31, FIG. 36 shows the front panel 258 of a waterproof transceiver 242. The front panel has a waterproof electrical connector 247 for connection of an antenna to the transceiver 242. A waterproof external display and control box 273 is connected to the transceiver 242 front panel 258 using front panel connector 253 and the control box 273 umbilical cable 259 connector 265. The control box 273 has a display 262 for user interaction with the transceiver 242. Push buttons 263 are used for user control of the transceiver 242. Up-down buttons 266 are used to set transceiver functions. The transceiver headset 275 is embedded within the facemask of an underwater breathing apparatus. In this embodiment of the invention, a user can use the through-the-earth radio system while wearing a diving gear. The transceiver headset 275 is connected to the control box 273 using the umbilical cable 274. The transceiver headset 75 contains a microphone (not shown) and a pair of headphone speakers 272. A Push-To-Talk (PTT) button 251 is located on the control box 273 and is depressed when the user wants to talk on the radio.

Figure 37:
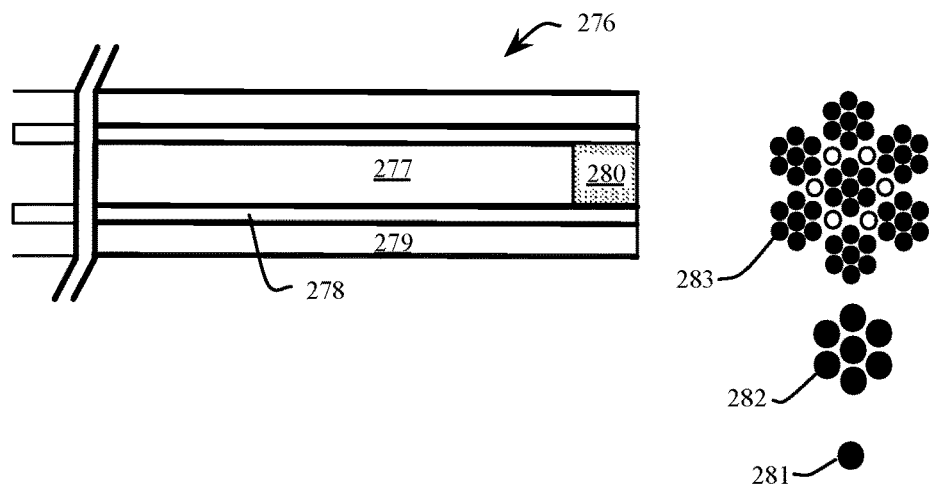
FIG. 37 shows a cross-sectional view of a subsurface through-the-earth radio antenna cable and different antenna conductor designs.

Referring now to the invention in more detail, in FIG. 37 a flexible trailing wire antenna 276 design is shown. The inner 277 core is a conductive metal, a fabric or solid color layer 278 surrounds the inner core 277. The outer sheath 279 of the trailing wire antenna is a low-friction, abrasion resistant, and transparent material such as PTFE. The end of the antenna 276 may be capped with a sealing cap 280. The inner core 277 design may be of the solid single wire design 281 or can be a multi-wire braided or twisted style 282. Another option for the inner core is a wire rope design 283.

Figure 38:
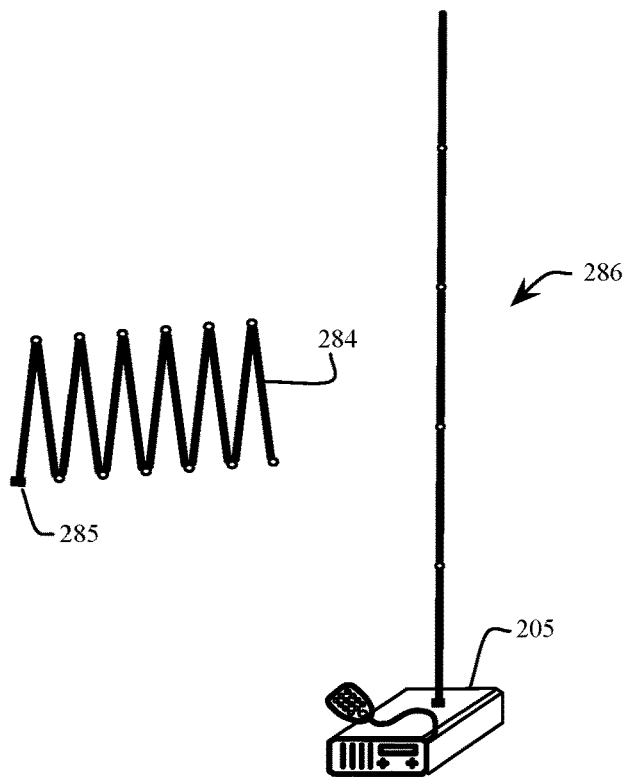
FIG. 38 shows a collapsible whip antenna for a subsurface through-the-earth radio system.

Referring now to the invention in more detail, in FIG. 38 a collapsible vertical antenna system 286 that is comprised of a series of interlocking hollow metal tubes 284 is shown. An elastic shock-cord runs through the center of each pole and is secured at the upper end of the highest tube and at the lower ended of the bottom tube. The elastic shock cord allows the antenna to be quickly erected and quickly collapsed. A connector 285 allows the antenna to be directly attached to the through-the-earth radio transceiver 205.

Figure 39:
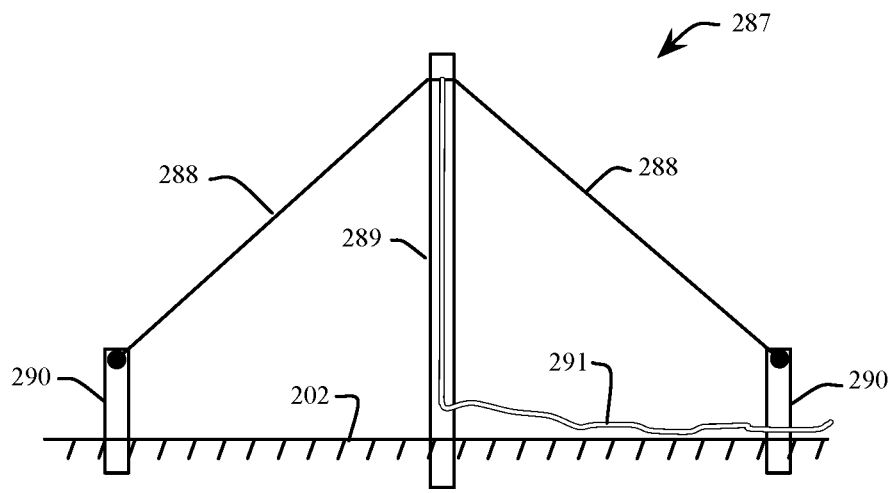
FIG. 39 shows a stationary dipole antenna for a subsurface through-the-earth radio system.

Referring now to the invention in more detail, in FIG. 39 a fixed through-the-earth antenna system 287 is shown. Shown is an antenna called an inverted "V" antenna 287. This is a dipole where two equal length elements 288 have elevated ends at the apex with the far ends of elements mounted closer to the ground 202. A radio frequency feed line 291 is connected to the apex or center of the antenna 287 and connects the antenna 287 to the through-the-earth radio transceiver.

Figure 40:
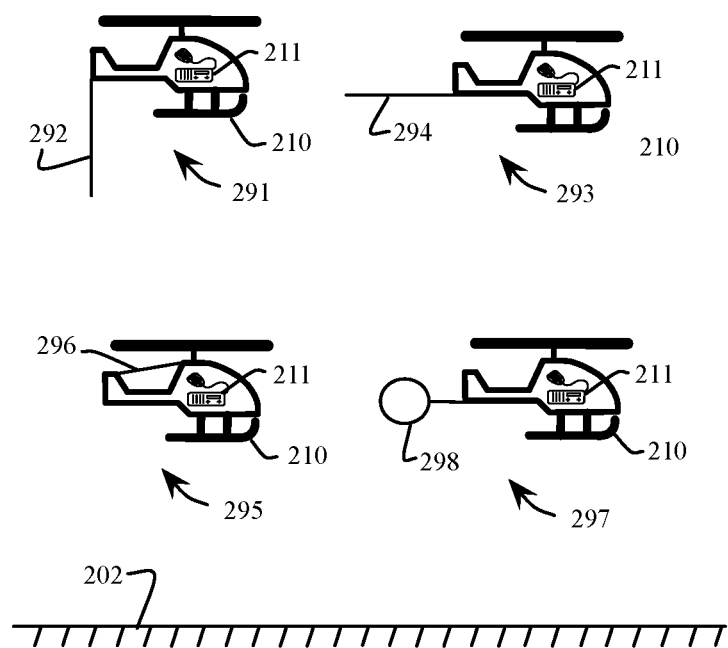
FIG. 40 shows different antenna designs used by four aircraft carrying a subsurface through-the-earth radio system transceiver.

Referring now to the invention in more detail, in FIG. 40 a plurality of aircraft 210 mounted through-the-earth antenna systems 291, 293, 295, 297 are shown and are connected to the respective through-the-earth transceivers 211. Aircraft antenna design 291 uses a flexible or rigid or semi-rigid conductive antenna element 292 that is suspended vertically from the aircraft 291. This element can be at any angle between vertical and horizontal relative to the plane of the earth. This same element is shown to be in the completely horizontal plane in design 293. The aircraft may also use a length of wire 296 suspended between two insulated points on an aircraft 210 to form an antenna as shown in antenna system 295. The aircraft may also use a loop antenna 298 attached to the aircraft 210 as shown in antenna system 297.

Figure 41:
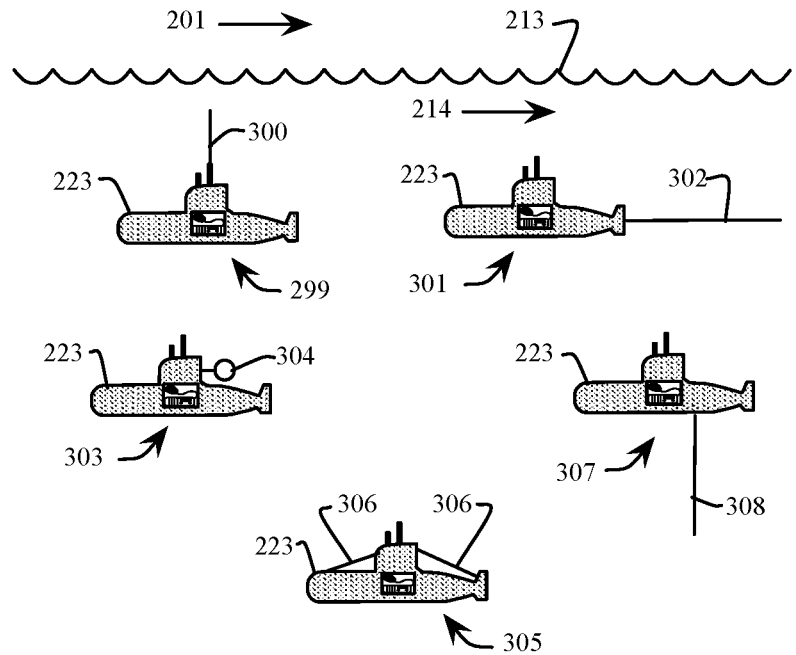
FIG. 41 shows different antenna designs used by five submersible vessels carrying a subsurface through-the-earth radio system transceiver.

Referring now to the invention in more detail, in FIG. 41 a plurality of submersibles 223 mounted through-the-earth antenna systems 299, 301, 303, 305, 307 are shown and are connected to the through-the-earth transceiver. Submersible antenna design 299 uses an insulated flexible or rigid or semi-rigid conductive antenna element 300 that is buoyantly suspended vertically and is connected to the submersible 223. An antenna element 308 can also be weighted such that it is suspended below the submersible 223 as shown in antenna design 307. This element can be at any angle between vertical and horizontal relative to the plane of the earth. This same element is shown to be in the completely horizontal plane in design 301. The submersible may also use two lengths of wire 306 suspended between four insulated points on a submersible 223 to form a dipole antenna as shown in antenna system 305. The submersible may also use a loop antenna 304 attached to the submersible 223 as shown in antenna system 303.

Figure 42:
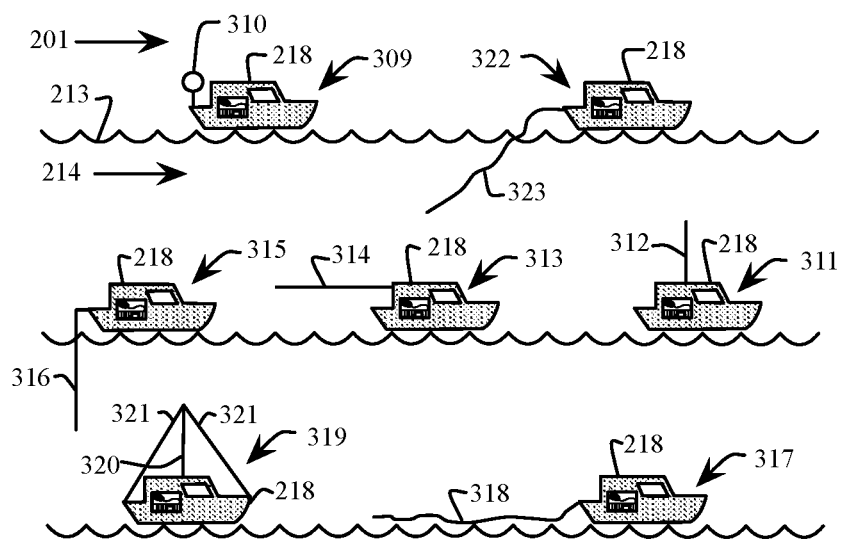
FIG. 42 shows different antenna designs used by seven marine surface vessels carrying a subsurface through-the-earth radio system transceiver, shown in three sections for ease of illustration.

Referring now to the invention in more detail, in FIG. 42 a plurality of marine vessels 218 mounted through-the-earth antenna systems 309, 311, 313, 315, 317, 319, 322 are shown and are connected to the through-the-earth transceiver. The antenna elements are flexible or rigid or semi-rigid conductive sections. Vessel 218 antenna design 309 uses a loop antenna 310 attached to the vessel 218. Vessel 218 antenna design 311 uses a rigid vertical element antenna 312 attached to the vessel 218. Vessel 218 antenna design 313 uses a rigid horizontal antenna element 314 attached to the vessel 218. Vessel 218 antenna design 315 uses a rigid or weighted flexible antenna element 316 that is insulated and suspended from the vessel 218 and into the water 214. Vessel 218 antenna design 317 uses a rigid or flexible trailing antenna element 316 that is insulated and is floated on the water's surface 213 and trailed from the vessel 218. Similar vessel 218 antenna design 322 uses a rigid or flexible trailing antenna element 323 that is insulated and has a negative buoyancy and can be at angles between completely horizontal and completely vertical relative to the water's surface 213. Antenna element 323 is trailed from the vessel 218. Vessel 218 antenna design 319 uses two antenna elements 321 that is center-fed at the mast 320 with each end of the antenna elements 321 insulated from the vessel 218. The forward and aft antenna connection points on the vessel 218 are lower than the mast 320 and thus form an inverted "V" dipole antenna.

Figure 43:
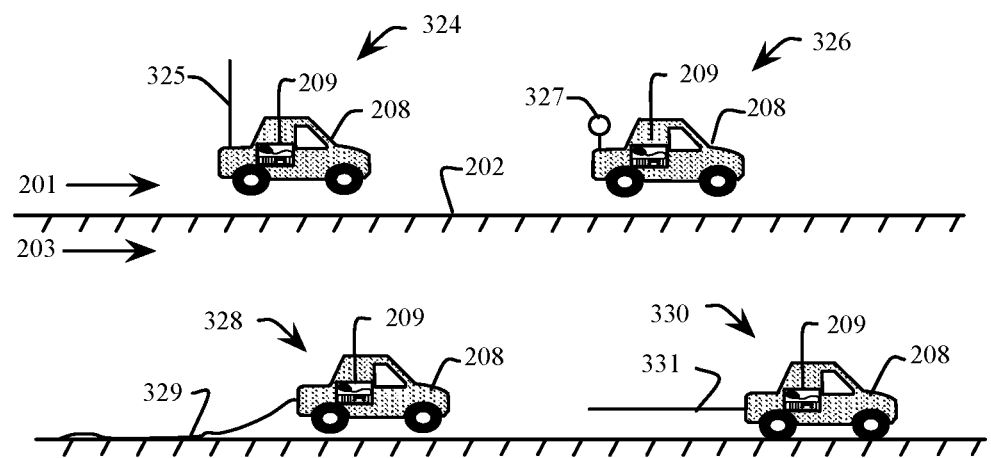
FIG. 43 shows different antenna designs used by four terrestrial vehicles carrying a subsurface through-the-earth radio system transceiver, shown in two sections for ease of illustration.

Referring now to the invention in more detail, in FIG. 43 a plurality of vehicles 208 mounted through-the-earth antenna systems 324, 326, 328, 330 are shown and are connected to the through-the-earth transceiver. The antenna elements are flexible or rigid or semi-rigid conductive sections. Vehicle 208 antenna design 324 uses a rigid vertical element antenna 325 attached to the vehicle 208. Vehicle 208 antenna design 326 uses a loop antenna 327 attached to the vehicle 208. Vehicle 208 antenna design 328 uses a flexible trailing antenna element 329 that is insulated and attached to the vehicle 208 and trailed behind the vehicle 208. Vehicle 208 antenna design 330 uses a rigid, horizontal, antenna element 331 mounted to the vehicle 208 and directed away from the vehicle 208.

Figure 44:
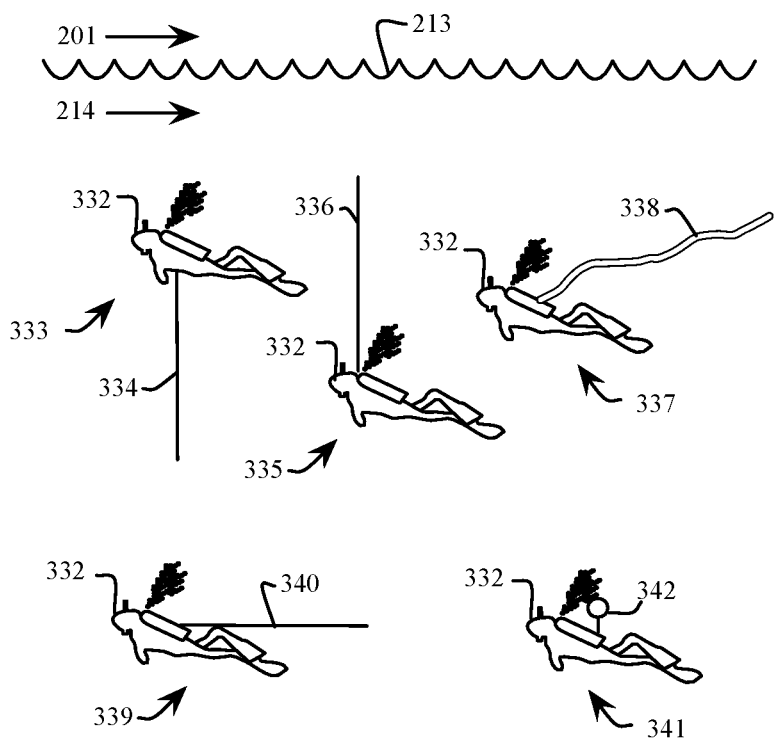
FIG. 44 shows different antenna designs used by five underwater divers carrying a subsurface through-the-earth radio system transceiver.

Referring now to the invention in more detail, in FIG. 44 a plurality of submerged divers 332-mounted through-the-earth antenna systems 333, 335, 337, 339, 341 are shown and are connected to the through-the-earth transceiver. An insulated, flexible or rigid or semi-rigid conductive antenna element 334 can be weighted such that it is suspended below the diver 332 as shown in antenna design 333. Diver 332 antenna design 335 uses an element 336 that is buoyantly suspended in the water 214 vertically and is connected to the diver 332. This antenna element 338 can be at any angle between vertical and horizontal relative to the plane of the earth as shown in diver 332 antenna design 337. This same element is shown to be in the completely horizontal plane in design 339. The diver 332 may also use a loop antenna 342 attached to the diver 332 as shown in antenna system 341.

Figure 45:
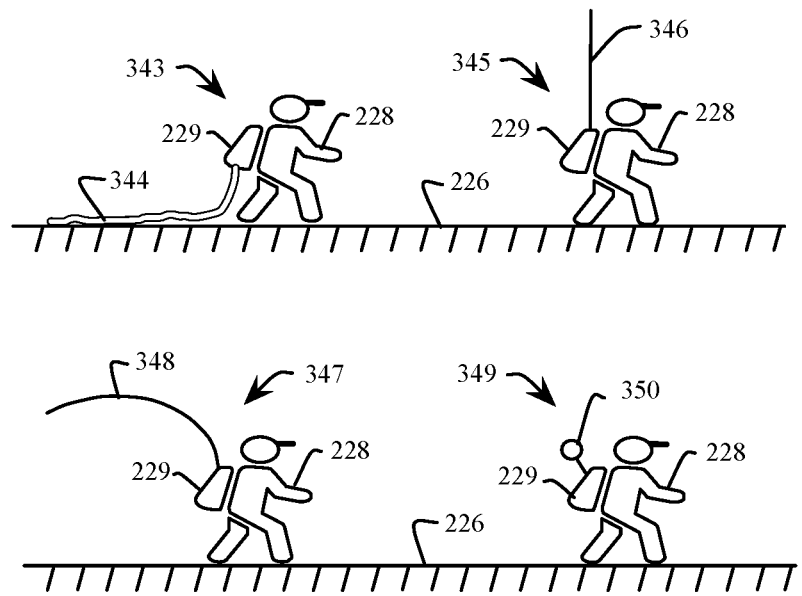
FIG. 45 shows different antenna designs used by four humans on foot carrying a subsurface through-the-earth radio system transceiver, shown in two sections for ease of illustration.

Referring now to the invention in more detail, in FIG. 45 a plurality of humans 228 mounted through-the-earth antenna systems 343, 345, 347, 349 are shown and are connected to the through-the-earth transceiver. Human 228 antenna design 343 uses a flexible trailing antenna element 344 that is insulated and attached to the human 228 and is trailed behind the human, connected to the transceiver through a backpack 229. Human 228 antenna design 345 uses a semi-rigid, vertically oriented antenna element 346 mounted to the human 228. Human 228 antenna design 347 uses a semi-rigid, antenna element 348 mounted to the human 228 and can be at a variety of angles relative to the walking plane 226. Human 228 antenna design 349 uses a loop antenna 350 attached to the human 228.

Figure 46:
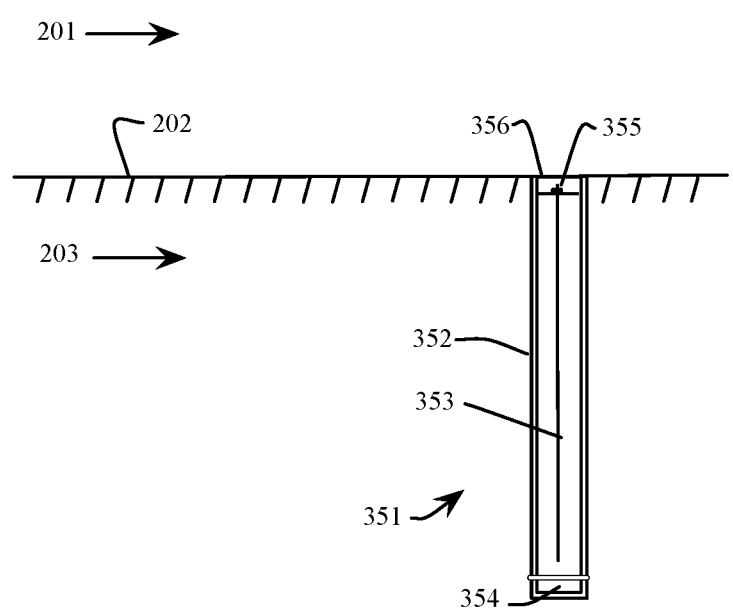
FIG. 46 shows a permanent, fixed, antenna design that is buried in the earth or other structure.

Referring now to the invention in more detail, in FIG. 46 a prepositioned antenna system 351 consisting of an antenna element 353 and positioned in a subsurface borehole enclosure 352 with a sealing bottom device 354 and a antenna connector 355. Top cap 356 protects antenna and connector while not in use.

Figure 47:
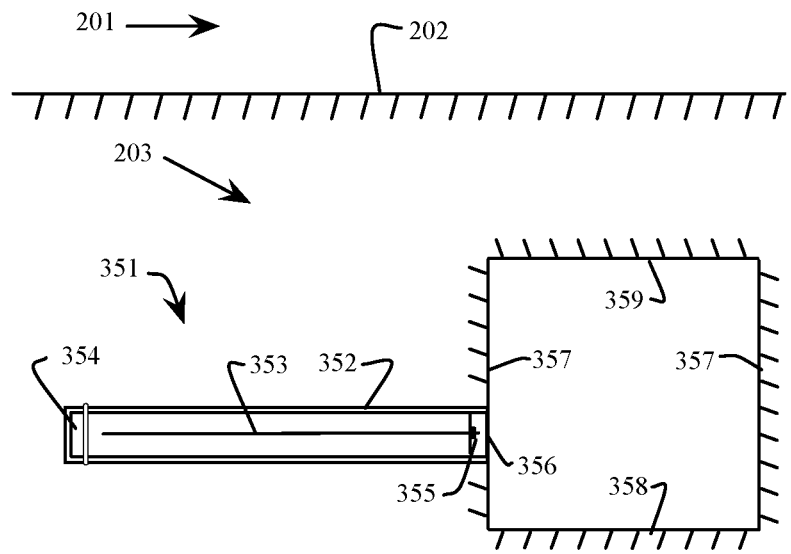
FIG. 47 shows a permanent, fixed, antenna design that is horizontally buried in the earth or other structure from an underground access point such as a mine entry.

Referring now to the invention in more detail, in FIG. 47 a prepositioned subsurface antenna system 351 consisting of an antenna element 353 and positioned in a subsurface horizontal borehole enclosure 352 with a sealing end device 354 and a antenna connector 355. A protective cap 356 protects antenna and connector while not in use. The antenna system 351 may be prepositioned in an underground mine where access to the antenna is from a passageway in a mine having a floor 358, a roof 359 and two mine ribs 357.

Figure 48:
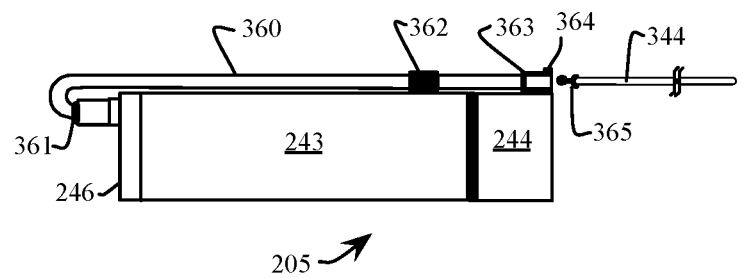
FIG. 48 shows an antenna adapter to allow a trailing antenna to be used with a mobile subsurface through-the-earth radio system carried in a backpack or carried with a shoulder strap.

Referring now to the invention in more detail, in FIG. 48 a device to connect a trailing antenna to the radio 205 is shown with a connector 361 that attaches to the antenna output connector located on the front panel 246 and said connector 361 is connected to a semi-rigid coaxial feed line 360 and said feed line is terminated into a female connector 363 that receives the connector 365 attached to the trailing wire antenna 344. Said female connector 363 has a release mechanism 364 to release the antenna connector when desired. Said feed line 360 and attached rear connector 363 is flush with the bottom of the battery pack. Said feed line 360 and is secured to the radio using the feed line mounting bracket 362.

Figure 49:
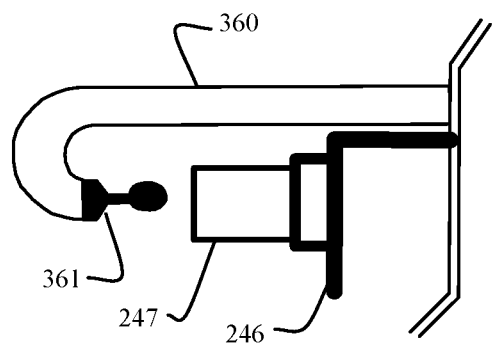
FIG. 49 shows an antenna adapter connection to the front panel of the subsurface through-the-earth transceiver.

Referring now to the invention in more detail, in FIG. 49 the front panel connector 361 from FIG. 48 is expanded to show the unconnected state where the male end of the feed line 361 is shown and also shown is the female end of the connector 247 mounted to the radio front panel 246. Said connector 247 is designed to receive, in addition to the feed line, the connector attached to the end of the trailing wire antenna (365 in FIG. 48).

Figure 50:
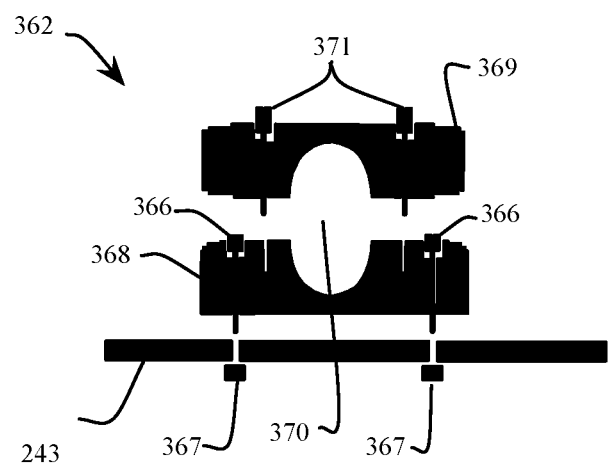
FIG. 50 shows an antenna adapter securing-bracket attached to the body of a subsurface through-the-earth radio transceiver.

Referring now to the invention in more detail, in FIG. 50 securing bracket 362 for the feed line is shown in greater detail and includes the lower portion of the bracket 368 and the two mounting screws 366 for attached the lower portion of the bracket 368 to the radio body 243 (FIG. 29) using two waterproof attachment nuts 367 and the circular cutout on both the lower 368 and upper bracket 369 are designed to tightly receive the feed line 370 and upon inserting the feed line screws 371 are tightened to securely hold the feed line in place. Said screws 371 are designed for a user to easily tighten or remove them.

Figure 51:
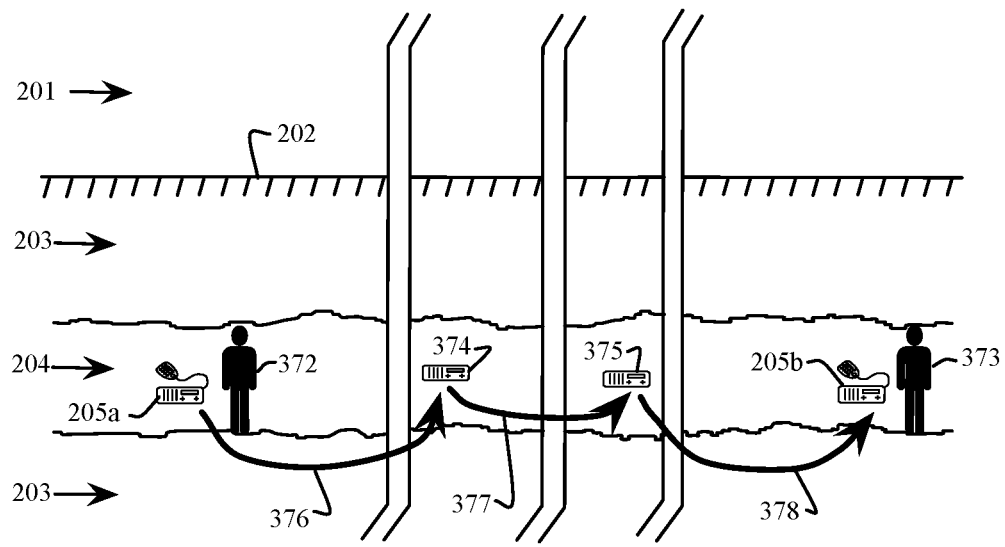
FIG. 51 is a cross sectional view showing a subsurface through-the-earth radio transceiver and multiple underground repeaters to allow extended underground or underwater communication ranges.

Referring now to the invention in more detail, in FIG. 51 a subsurface passageway 204 is bounded above and below by earth 203 where the earth 203 atmosphere 201 boundary 202 represents the surface of the earth. In said passageway 204 a human 372 has a transceiver 205a and uses intermediary store-and-forward devices 374, 375 to send a message to a recipient human 373 with a transceiver 205b. Said store-and-forward devices 374, 375 receive and record a complete transmission episode 376 and then repeat said message on the same frequency. More specifically, the originator human 372 uses a transceiver 205a to send a message 376, whereas a store-and-forward device 374 is in range and can receive the original message 376 whereas the other store-and-forward device 375 is out of range of the original transmitted message 376. Upon the complete reception of the original message 376 store-and-forward device 374 retransmits 377 the stored message 376. Said second store-and-forward device 375 is in range of the first store-and-forward device 374 and can receive the retransmitted message 377. Upon the complete reception of the second hop 377 of the original message 376 the second store-and-forward device 375 retransmits its stored original message 376 whereas the recipient human 373 is in range of the second store-and-forward device 375 and receives the third hop 378 of the original message 376.

Figure 52:
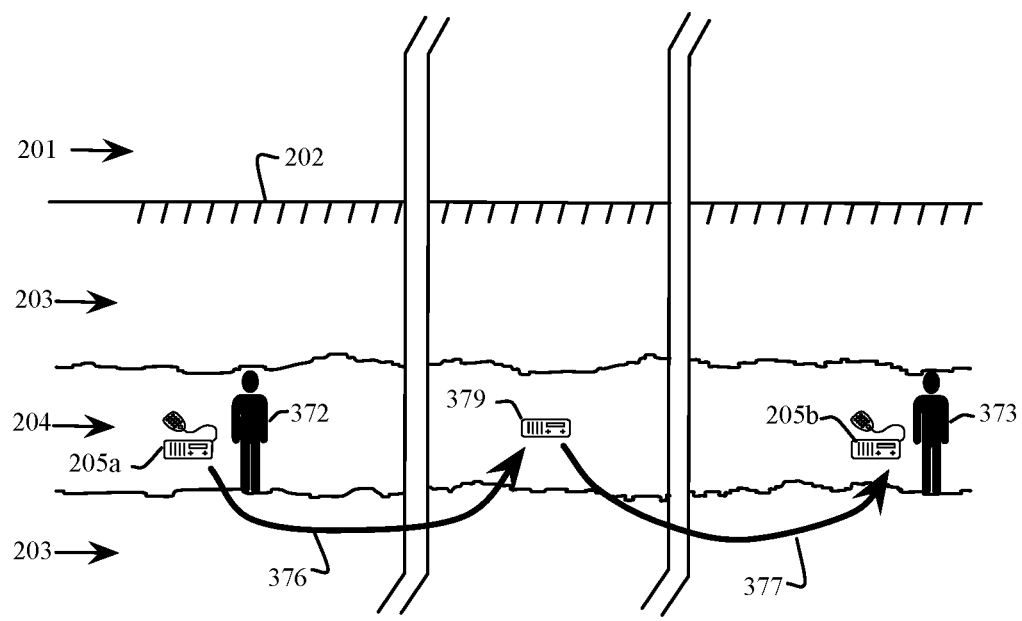
FIG. 52 is a cross sectional view showing a subsurface through-the-earth radio transceiver and a store-and-forward underground repeater to allow extended underground or underwater communication ranges.

Referring now to the invention in more detail, in FIG. 52 a subsurface passageway 204 is bounded above and below by earth 203 where the earth 203 atmosphere 201 boundary 202 represents the surface of the earth. In said passageway 204 a human 372 has a transceiver 205a and uses intermediary repeater 379 to forward a message to a recipient human 373 with a transceiver 205b. Said repeater 379 receives a transmission 376 from human 372 with transceiver 205a and immediately retransmits the message 376. Said retransmitted message 377 is on a different frequency than the original message 376 and is sent immediately upon receipt by repeater 379. Said recipient human 373 with transceiver set to frequency of repeater message 377 signal receives the original message 376.

Figure 53:
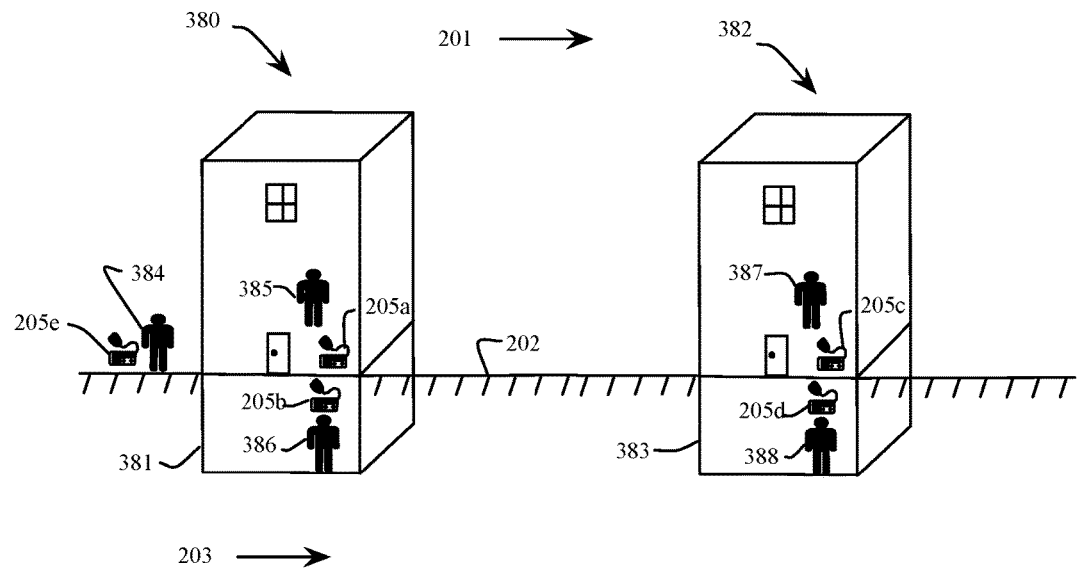
FIG. 53 is a perspective view showing a subsurface through-the-earth radio system being used to communicate into, within, and between large buildings that traditionally block radio communications.

Referring now to the invention in more detail, in FIG. 53 a pair of multi-story buildings 380, 382 are shown. Said building 380 contains a human 385 with a transceiver 205a on an elevated floor and said building 380 also contains a human 386 with a transceiver 205b in a basement 381. Said building 382 has a human 387 with a transceiver 205c on an elevated floor and additionally contains a human 388 with a transceiver 205d in a basement 383. The earth's surface 202 shows a human 384 with a transceiver 205e external to either building 380, 382. Said human 384 can use the transceiver 205e to bi-directionally communicate with elevated human 385 and basement 381 human 386 located in building 380. Said human 384 can use the transceiver 205e to bi-directionally communicate with elevated human 387 and basement 383 human 388 in building 382. Said human 385 can use transceiver 205a to bi-directionally communicate with said human 386 located in building 180 basement 381. Said human 386 can use the transceiver 205b to bi-directionally communicate with elevated human 387 and basement 383 human 388 in building 382.

Figure 54:
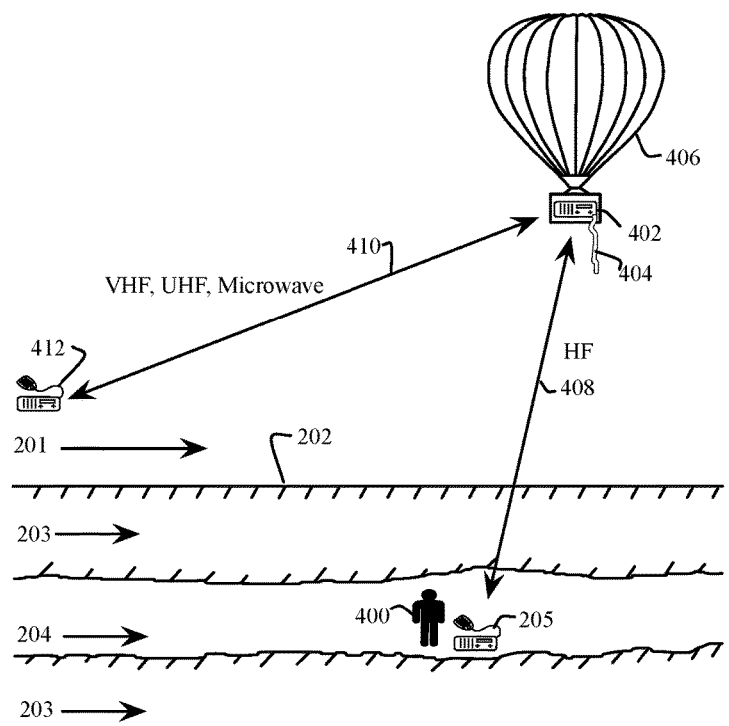
FIG. 54 is a cross sectional view of a subsurface through-the-earth radio system showing communications linkage between an repeater transported by a balloon and an underground transceiver.

Referring to FIG. 54, an embodiment is shown where a human 400 uses a transceiver 205 to communicate over long distances with a repeater 402, (or linear transponder), having an antenna 404 and being transported by a balloon 406 (e.g., a hot air balloon or a helium filled balloon). The transceiver 205 communicates bidirectionally over an HF link 408, with the repeater 402. The repeater 402 communicates bidirectionally over a line-of-sight link 410 operating at a higher frequency (e.g., VHF, UHF, or microwave), with another transceiver 412 capable of operating at the higher frequency.

Additional Example Embodiments

The following are example embodiments, including at least some explicitly enumerated as "ECs" (Example Combinations), providing additional description of a variety of embodiment types in accordance with the concepts described herein; these examples are not meant to be mutually exclusive, exhaustive, or restrictive; and the invention is not limited to these example embodiments but rather encompasses all possible modifications and variations within the scope of the issued claims and their equivalents.

EC1: A communications system that can establish a communications link between on or above the earth's surface and subsurface locations wherein said subsurface locations comprises underground, underwater, and under ice locations. Said on or above the earth's surface comprises on the earth's surface, elevated locations above the earth's surface including space. Said earth's surface includes the interface between the atmosphere and any natural or man-made material that forms the lower boundary of the atmosphere. Said communications link applies to separations vectors that are three dimensional such that they may be offset from one point to another and can have vertical offsets, horizontal offsets or both. Said communications link employ radios, which can utilize a transmit-only radio (transmitter), or a receive-only radio (receiver) or a bi-directional transmit-receive radio (transceiver). Said term radio can refer to any of the styles including transmit-only, receive-only, and transceiver versions of the communications system.

EC2: The communications system of EC1 where a plurality radios can be functioning simultaneously to form a communications network.

EC3: The communications system of EC1 where the radios are of the digital software defined radio (SDR) architecture.

EC4: The communications system of EC1 where all communications devices are located in the subsurface.

EC5: The communications system of EC1 that can be used in, on, or above other non-Earth planetary bodies.

EC6: The communications system of EC1 uses frequencies between 2.0 MHz and 3.0 MHz and said frequencies lie in the upper part of the Medium Frequency (MF) radio spectrum band.

EC7: The communications system of EC1 uses frequencies between 3.0MHz and 30.0 MHz and said frequencies lie within the entire High Frequency (HF) radio spectrum band.

EC8: The communications system of EC1 uses frequencies between 30.0MHz and 150.0 MHz and said frequencies lie in the lower part of the Very High Frequency (VHF) radio spectrum band.

EC9: The communications system of EC1 that can establish a communications link between two subsurface locations.

EC10: The subsurface locations of EC1 includes underground locations occupied by humans.

EC11: The subsurface locations of EC1 includes underground unmanned data devices or unmanned control devices and or unmanned machinery.

EC12: The subsurface locations of EC1 includes underground weapons where weapons includes mines, munitions, earth-penetrating munitions, and self-driven weapon devices.

EC13: The subsurface locations of EC1 includes underground vehicles where said vehicle includes tired, wheeled, rail, robotic, tracked, magnetically-levitated, air-cushioned vehicles which all can be manned or unmanned or autonomous.

EC14: The subsurface locations of EC1 includes underwater submersible vessels where said submersible vehicle includes submarines and bottom-dwelling tired, wheeled, rail, robotic, tracked, magnetically-levitated vehicles which all can be manned or unmanned or autonomous.

EC15: The subsurface locations of EC1 includes underwater weapon systems where weapons includes mines, munitions, torpedoes, water-penetrating munitions, depth charges, and self-propelled weapon devices.

EC16: The subsurface locations of EC1 includes underwater unmanned data devices or unmanned control devices and or unmanned machinery.

EC17: The subsurface locations of EC1 includes locations located beneath a body of water which said location is underground.

EC18: The subsurface locations of EC1 includes underwater divers.

EC19: The subsurface locations of EC1 includes intra-ice locations occupied by humans.

EC20: The subsurface locations of EC1 includes intra-ice unmanned data devices or unmanned control devices and or unmanned machinery.

EC21: The subsurface locations of EC1 includes intra-ice vehicles where said vehicle includes tired, wheeled, rail, robotic, tracked, auger-driven, magnetically-levitated, air-cushioned vehicles which all can be manned or unmanned or autonomous.

EC22: The subsurface locations of EC1 includes locations located beneath a body of ice which said location is underground.

EC23: The subsurface locations of EC1 includes intra-ice weapon systems where weapons includes mines, munitions, ice-penetrating, munitions, and self-driven weapon devices.

EC24: The communications system of EC1 that uses analog modulation.

EC25: The communications system of EC1 that uses digital modulation.

EC26: The communications system of EC1 that uses voice communications.

EC27: The communications system of EC1 that uses data communications.

EC28: The communications system of EC1 that uses encrypted voice communications.

EC29: The communications system of EC1 that uses encrypted data communications.

EC30: The communications system of EC1 that uses scrambled voice communications.

EC31: The communications system of EC1 that uses single side band (SSB) modulation.

EC32: The communications system of EC1 that uses double side band (DSB) modulation.

EC33: The communications system of EC1 that uses amplitude modulation (AM).

EC34: The communications system of EC1 that uses frequency modulation (FM).

EC35: The communications system of EC1 that uses Morse code.

EC36: The communications system of EC1 that uses base band digital communications.

EC37: The communications system of EC1 that uses phase-shift keying (PSK) modulation.

EC38: The communications system of EC1 that uses frequency-shift keying (FSK) modulation.

EC39: The communications system of EC1 that uses quadrature amplitude modulation (QAM).

EC40: The communications system of EC1 that uses amplitude-shift keying (ASK) modulation.

EC41: The communications system of EC1 that uses On-Off keying (OOK) modulation.

EC42: The communications system of EC1 that can establish communications between terrestrial surface vehicles and subsurface locations.

EC43: The communications system of EC1 that can establish a communications link between flying aircraft and subsurface locations where said aircraft includes any aircraft type as defined by the Federal Aviation Administration (FAA).

EC44: The communications system of EC1 that can establish a communications link between spacecraft and subsurface locations where spacecraft said vehicles include space vehicles (SVs), space stations, satellites, and propelled space vehicles whether manned or unmanned.

EC45: The communications system of EC1 that can establish a communications link between rockets and subsurface locations where said rockets include boost-phase or glide-phase or reentry-phase flight in the Earth's atmosphere and boost-phase or glide-phase or reentry-phase external to the Earth's atmosphere whether manned or unmanned.

EC46: The communications system of EC1 that can establish communications between marine vessels and subsurface locations.

EC47: The communications system of EC1 that can establish communications between a submersible marine vessel and surface, above surface, and subsurface locations.

EC48: The communications system of EC1 that can establish communications between a submerged diver and surface, above surface, and subsurface locations.

EC49: The communications system of EC1 that can establish communications between an underground manned or robotic or autonomous vehicle or machine and surface, above surface, and subsurface locations.

EC50: The communications system of EC1 can be further applied to establish a communications link between on or below or above the earth's surface and man-made structure and building interiors where conventional Very High Frequency (VHF) and higher frequency radios do not function. Building interiors include any location within the building including basements, sub-basements, ground level floors and above ground level floors. Said man-made structures and buildings include functional, non-functional, and collapsed man-made structures and buildings.

EC51: The communications system of EC50 can be further applied to establish a communications link between locations wholly within the said functional, non-functional, and collapsed man-made structures and buildings.

EC52: The communications system of EC1 can be used as a human-carried portable communications radio.

EC53: The communications system of EC52 can be carried in a backpack enclosure.

EC54: The communications system of EC52 can be carried using a shoulder strap.

EC55: The carrying systems of EC53 and EC54 have quick-release mechanisms to quickly release the strap or backpack if the radio has to be quickly removed from the human carrier.

EC56: The communications system of EC52 can be hand-carried in a portable case.

EC57: The communications system of EC1 can be used as a permanent, stationary, base station.

EC58: The communications system of EC1 can be used as a temporary, stationary, base station.

EC59: The communications system of EC1 can be pre-deployed or cached in locations for emergency use.

EC60: The communications system of EC1 is configured as a vehicle-mounted radio.

EC61: The communications system of EC1 is configured as an aircraft-mounted radio.

EC62: The communications system of EC1 is configured as a marine-vessel-mounted radio.

EC63: The communications system of EC1 is configured as a submersible-vessel-mounted radio where said submersible vessel includes water floor crawling vehicles.

EC64: The communications system of EC1 is configured as a weapon-mounted radio.

EC65: The communications system of EC1 uses a much-shorter-than-a-wavelength length of a conductor for a transmit and receive antenna where one end is connected to the radio and the other end is unattached.

EC66: The conductor in the antenna of EC65 is a solid wire.

EC67: The conductor in the antenna of EC65 is a multi-strand wire.

EC68: The conductor in the antenna of EC65 is a wire-rope design.

EC69: The antenna of EC65 is coated with an abrasion-resistant, low friction, insulating, colored or transparent coating.

EC70: The antenna of EC65 uses different coating colors to allow the rapid discrimination of the different antennas based on length.

EC71: The antenna of EC65 uses a fabric, colored coating on the conductor further coated by a transparent abrasion-resistant, low friction, insulating, outer coating to allow the rapid discrimination of the different antennas by color.

EC72: The antenna of EC65 has the free end of the antenna insulted by removing a small length of the conductor and filling the void with an insulating material.

EC73: The communications system of EC1 includes a set of said antennas described in EC65 of varying lengths and of varying colors and a chart is used to match antenna color for the needed communications range and the frequency to use.

EC74: The antenna of EC65 has a quick release male type connector for rapid attachment and detachment to and from the radio.

EC75: The communications radio of EC1 has a female quick release type connector for the rapid attachment and detachment of the antenna of EC84 to and from the radio.

EC76: The radio may use collapsible vertical antennas.

EC77: The radio uses any typical HF and VHF antennas including dipole antennas, loop antennas, Yagi antennas, "inverted V" antennas, long wire antennas, whip antennas, vertical element antennas, etc. and deployed in permanent locations, temporary locations, or mobile operations.

EC78: The antenna of EC65 is trailed by a walking, standing, or sitting human and is attached to the radio either directly or through a radio frequency (RF) feed-line.

EC79: The antenna of EC65 is trailed by a surface or underground or underwater vehicle and is attached to the radio either directly or through a radio frequency (RF) feed-line.

EC80: The antenna of EC65 is trailed by a flying aircraft and is oriented in any position between vertical and horizontal and is attached to the radio either directly or through an RF feed-line.

EC81: The antenna of EC65 is connected between two insulated points on an aircraft with a feed-line attaching the antenna to the radio and is attached to the radio either directly or through a radio frequency (RF) feed-line.

EC82: The antenna of EC65 is trailed by on the water's surface a marine vessel using buoyancy floats attached to the antenna and is attached to the radio either directly or through a radio frequency (RF) feed-line.

EC83: The antenna of EC65 is trailed by a marine vessel can be oriented in any position between vertical and horizontal in the water and above the water and is attached to the radio either directly or through an radio frequency (RF) feed-line.

EC84: The antenna of EC65 is connected between two insulated points on a marine vessel with a feed-line attaching the antenna to the radio and is attached to the radio either directly or through an radio frequency (RF) feed-line.

EC85: The antenna of EC65 is trailed by a submersible vessel can be oriented in any position between vertical and horizontal in the water and is attached to the radio either directly or through an radio frequency (RF) feed-line.

EC86: The antenna of EC65 is connected between two insulated points on an submersible with a feed-line attaching the antenna to the radio and is attached to the radio either directly or through an radio frequency (RF) feed-line.

EC87: The antenna of EC65 is trailed by a underwater diver can be oriented in any position between vertical and horizontal in the water and is attached to the radio either directly or through an Radio frequency (RF) feed-line.

EC88: The antenna of EC65 is connected between two insulated points on an marine vessel with a feed-line attaching the antenna to the radio and is attached to the radio either directly or through an Radio frequency (RF) feed-line.

EC89: The antenna of EC65 is connected to a weapon and is attached to the radio either directly or through an radio frequency (RF) feed-line.

EC90: The antenna of EC65 is connected a data device or control device and is attached to the radio either directly or through an radio frequency (RF) feed-line.

EC91: The antenna of EC65 is connected a spacecraft and is attached to the radio either directly or through an radio frequency (RF) feed-line.

EC92: The antenna of EC65 is connected a rocket and is attached to the radio either directly or through an radio frequency (RF) feed-line.

EC93: The antenna of EC65 is pre-deployed in a subsurface or surface location in either a horizontal, vertical, or any angle in between antenna orientation using a protective non-conductive housing and a rapid pre-attached cable for connecting the antenna to the radio and is attached to the radio either directly or through an radio frequency (RF) feed-line.

EC94: The antenna may be a loop antenna and carried or attached to a walking, standing, or sitting human and is attached to the radio either directly or through a radio frequency (RF) feed-line.

EC95: The antenna may be a loop antenna and carried or attached to a surface or underground or underwater vehicle including robotic systems and is attached to the radio either directly or through a radio frequency (RF) feed-line.

EC96: The antenna may be a loop antenna and carried or attached to a flying aircraft and is attached to the radio either directly or through an radio frequency (RF) feed-line.

EC97: The antenna may be a loop antenna and carried or attached to a marine vessel using buoyancy floats attached to the antenna and is attached to the radio either directly or through an radio frequency (RF) feed-line.

EC98: The antenna may be a loop antenna and carried or attached to a submersible vessel and is attached to the radio either directly or through an radio frequency (RF) feed-line.

EC99: The antenna may be a loop antenna and carried or attached to a underwater diver and is attached to the radio either directly or through an radio frequency (RF) feed-line.

EC100: The antenna may be a loop antenna and carried or attached to a weapon and is attached to the radio either directly or through an radio frequency (RF) feed-line.

EC101: The antenna may be a loop antenna and carried or attached to a data device or control device and is attached to the radio either directly or through an RF feed-line.

EC102: The radio of EC1 contains an internal auto-tuner for antenna impedance matching.

EC103: The radio of EC1 contains uses an external automatic or manual tuner for antenna impedance matching.

EC104: The radio of EC1 contains a front panel connector for connecting to a data source for one-way or bi-directional data communications.

EC105: The radio of EC1 contains a front panel display, a panel-mounted speaker, and a plurality of user interface buttons for radio control.

EC106: The radio of EC1 contains a front panel connector for connecting to a handset and said handset incorporates a push-to-talk (PTT) button, a microphone (transmitter), and a speaker (receiver) where said terms transmitter and receiver are terms used in the telephone industry for parts of a audio handset.

EC107: The radio of EC1 contains a front panel connector for connecting to a headset where said headset utilizes and a headphone and a microphone mounted into a head-worn device where the headsets uses either a single-ear or a double-ear headphone element. Said headset provides the user with the equivalent functionality of a handset but with hands-free operation. The cable that connects said headset to the radio front panel connector incorporates an in-line push-to-talk (PTT) button. Said headset can be incorporated into a breathing apparatus facemask for operations in hazardous atmospheres.

EC108: The radio of EC1 contains a front panel with no display and no user controls and is attached to a handset and said handset incorporates a display, buttons for radio control, a push-to-talk (PTT) button, a microphone (transmitter), and a speaker (receiver) where said terms transmitter and receiver are terms used in the telephone industry for parts of an audio handset.

EC109: The radio of EC1 contains a front panel with no display and no user controls and is attached to a tethered external control box and said control box incorporates a display, buttons for radio control and said control box is connected using a cable that contains an in-line push-to-talk (PTT) button and is further connected to a headset that contains a microphone (transmitter), and a speaker (receiver) where said terms transmitter and receiver are terms used in the telephone industry for parts of an audio handset. Said headset can be incorporated into a breathing apparatus facemask for operations in hazardous atmospheres.

EC110: The radio of EC1 is enclosed in a waterproof enclosure for deep water operation and contains a front panel with no display and no user controls and uses waterproof connectors for connecting to devices external to the radio.

EC111: The radio of EC1 is uses a waterproof, for deep water operations, external control enclosure containing waterproof buttons for user radio control, and uses a waterproof visual display, and use waterproof connectors for connecting to devices external to the control box and said control box is connected using a cable that contains an in-line, waterproof, push-to-talk (PTT) button and is further connected to a headset that contains a waterproof microphone and a waterproof headphone and said headset can be incorporated into a diver's breathing apparatus facemask for operations in underwater environments.

EC112: The radio of EC1 uses a Voice Operated Switch (VOX) for hands-free, voice-activated, initiation of communications and in lieu of a push-to-talk (PTT) button.

EC113: The radio of EC1 contains a single or plurality of front panel connector(s) for connecting to different antennas using a coaxial feed line or the quick release antenna connector of EC75.

EC114: The radio of EC1 contains a quick-change battery pack where the various packs use different battery chemistries and have different amp-hour ratings.

EC115: The radio of EC1 while on or above the surface may be interfaced to other types of radio equipment including cellular phones, UHF radios, VHF radios, land mobile radios (LMRs), wired telephones, Project 25 radios, satellites, etc. using an interface cable and device which in turn is connected to a another system. This is commonly known as cross-banding or a radio bridge.

EC116: The radio may use the signal processing techniques described in U.S. Pat. No. 8,462,829 for extended communications range and/or reduced transmitted power.

EC117: The radios may be modified to be used as underground repeaters.

EC118: The radios may be chained as underground store-and-forward repeaters.

Various embodiments of a radio communications system have been disclosed that provide bi-directional voice and data communications between underground, including intra-ice, locations and surface and above-surface locations. Additionally, the system provides bi-directional voice and data communications between underwater locations and surface and above-surface locations. Underwater to underwater and underground to underground communications are also provided. The system provides communications within and from outside-into large building where conventional radios do not work. Extremely short antennas, that can be 3% to 10% of a free-space wavelength, are used for highly mobile operation.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A subsurface radio comprising:
   a radio transceiver including a transmitter configured to transmit a voice data through a subsurface environment, and a receiver configured to receive the voice data through the subsurface environment;
   a subwavelength antenna coupled to the radio transceiver and configured to radiate an electromagnetic (EM) wave modulating the voice data, the subwavelength antenna having a radiating length less than a transceiver wavelength of the radio transceiver operating in free-space at a maximum of a transceiver frequency, wherein the transceiver frequency is one of a transmit frequency of the transmitter and a receive frequency of the receiver;
   a slave radio transceiver configured to transmit and the radio transceiver configured to receive, for each of a plurality of transceiver frequencies, a respective SNR and a respective signal strength;
   a control unit configured to change the transceiver frequency to an optimal transceiver frequency in response to a change to the subsurface environment; and
   an impedance matching circuit configured to match a first impedance of the subwavelength antenna to a second impedance of the transceiver in response to a difference between the first impedance and the second impedance exceeding an impedance mismatch value.

2. The device of claim 1 wherein the transceiver frequency is greater than or equal to 2 Mhz, and less than or equal to 150 Mhz.

3. The device of claim 1 wherein the radiating length of the subwavelength antenna is greater than one tenth of one percent of a freespace wavelength of the radio transceiver.

4. The device of claim 1 wherein a power output of the radio transceiver is equal to or less than 100 Watts.

5. The device of claim 1 further comprising a portable pack including the radio transceiver, the portable pack configured for removable attachment to a person and having a trailing antenna extending therefrom.

6. The device of claim 1 wherein the radio transceiver is configured as a base station.

7. The device of claim 1 wherein the subsurface environment is a subterranean environment.

8. The device of claim 1 wherein the subsurface environment is an aqueous environment.

9. The device of claim 1 wherein the subsurface environment is an interior of a building.

10. The device of claim 1 wherein the control unit detects a change to the subsurface environment by periodically measuring a signal to noise ratio (SNR) from a transmission between a second radio transceiver and the radio transceiver, the control unit modifying the transceiver frequency of the radio transceiver to maximize the SNR.

11. A method for subsurface radio communication comprising:

transmitting a voice data through a subsurface environment, by a transmitter of a radio transceiver;
receiving the voice data through the subsurface environment, by a receiver of the radio transceiver;
transmitting by a slave radio transceiver and receiving by the radio transceiver, for each of a plurality of transceiver frequencies, a respective SNR and a respective signal strength;
changing a transceiver frequency of the radio transceiver to an optimal transceiver frequency in response to a change to the subsurface environment, wherein the transceiver frequency is one of a transmit frequency of the transmitter and a receive frequency of the receiver; and
matching a first impedance of a subwavelength antenna to a second impedance of the transceiver in response to a difference between the first impedance and the second impedance exceeding an impedance mismatch value, the subwavelength antenna having a radiating length less than a transceiver wavelength of the radio transceiver operating in free-space at a maximum of the transceiver frequency.

12. The method of claim 11 further comprising:
initializing an underground optimal link establishment (UGOLE) operation by transmitting a UGOLE request from the radio transceiver to a slave radio transceiver tuned to a same transceiver frequency as the radio transceiver, and receiving from the slave radio transceiver a UGOLE reply, in response to the slave radio receiving the UGOLE request,
transmitting by the radio transceiver and receiving by the slave radio transceiver, for each of a plurality of transceiver frequencies, a continuous wave (CW) tone,
recording by the slave radio transceiver, for each of the plurality of transceiver frequencies, at least one of a respective signal to noise ratio (SNR) and a respective signal strength of the CW tone received by the slave radio transceiver,
transmitting by the slave radio transceiver and receiving by the radio transceiver, for each of the plurality of transceiver frequencies, the respective SNR and the respective signal strength,
transmitting by the slave radio transceiver and receiving by the radio transceiver, the CW tone for each of the plurality of transceiver frequencies,
recording by the radio transceiver, for each of the plurality of transceiver frequencies, at least one of the respective signal to noise ratio (SNR) and the respective signal strength of the CW tone received by the radio transceiver, and
determining the optimal transceiver frequency based on at least one of a respective maximum SNR and a respective maximum signal strength recorded from each of the transmissions from the radio transceiver to the slave radio transceiver and the transmissions from the slave radio transceiver to the radio transceiver.

13. The method claim 12 wherein the optimal transceiver frequency is determined as an average of a first maximum SNR from the transmissions from the radio transceiver to the slave radio transceiver and a second maximum SNR from the transmissions from the slave radio transceiver to the radio transceiver.

14. The method of claim 12 wherein the radio transceiver records the respective SNR and the respective signal strength of the CW tone transmitted by the slave radio transceiver for one of the plurality of transceiver frequencies before changing to a new one of the plurality of transceiver frequencies.

15. The method of claim 11 further comprising:
initiating an automatic channel control (ACC) operation by transmitting, by the radio transceiver, an ACC request to a slave radio transceiver on an old transceiver frequency,
changing the old transceiver frequency of the radio transceiver to a new transceiver frequency,
changing the old transceiver frequency of the slave radio to the new transceiver frequency in response to the slave radio receiving the ACC request,
receiving by the radio transceiver a handshake reply from the slave transceiver radio on the new transceiver frequency, in response to the slave transceiver radio receiving a handshake request from the radio transceiver on the new transceiver frequency,
changing the new transceiver frequency of the radio transceiver to the old transceiver frequency in response to the radio transceiver not receiving the handshake reply after a predetermined time, and
changing the new transceiver frequency of the slave radio transceiver to the old transceiver frequency in response to the slave radio transceiver not receiving the handshake request after the predetermined time.

16. The method of claim 11 further comprising determining the difference between the first impedance and the second impedance in response to the radio transceiver beginning transmission of the voice data, the transmission being interrupted when the difference exceeds the impedance mismatch value.

17. The method of claim 11 further comprising determining the difference between the first impedance and the second impedance from a voltage level and a phase of a reflected pulse from a slave radio transceiver, the reflected pulse reflected from the slave radio transceiver in response to a periodic pulse transmitted from the radio transceiver.

18. The method of claim 17 further comprising disabling a circuit configured to determine the difference between the first impedance and the second impedance in response to the radio transceiver beginning transmission of the voice data.

19. The method of claim 11 wherein determining the difference between the first impedance and the second impedance is based on a prediction of previously stored differences between the first impedance and the second impedance.

20. A method for subsurface radio communication comprising:
transmitting a data through a subsurface environment, by a transmitter of a radio transceiver;
receiving the data through the subsurface environment, by a receiver of the radio transceiver;
changing a transceiver frequency of the radio transceiver to an optimal transceiver frequency in response to a change to the subsurface environment, wherein the transceiver frequency is one of a transmit frequency of the transmitter and a receive frequency of the receiver, the optimal transceiver frequency determined from a maximum signal to noise ratio (SNR) measured from a transmission between the radio transceiver and a slave radio transceiver; and
matching a first impedance of a subwavelength antenna to a second impedance of the transceiver in response to a difference between the first impedance and the second impedance exceeding an impedance mismatch value, the subwavelength antenna having a radiating length less than a wavelength of a transceiver wavelength of the radio transceiver operating in free-space at a maximum of the transceiver frequency.

\* \* \* \* \*